United States Patent
Wang et al.

(10) Patent No.: US 12,497,612 B2
(45) Date of Patent: Dec. 16, 2025

(54) GENE REPLACEMENT THERAPY FOR FOXG1 SYNDROME

(71) Applicant: University of Massachusetts, Westborough, MA (US)

(72) Inventors: Dan Wang, Worcester, MA (US); Guangping Gao, Worcester, MA (US); Ailing Du, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 666 days.

(21) Appl. No.: 17/910,574

(22) PCT Filed: Mar. 8, 2021

(86) PCT No.: PCT/US2021/021358
§ 371 (c)(1),
(2) Date: Sep. 9, 2022

(87) PCT Pub. No.: WO2021/183433
PCT Pub. Date: Sep. 16, 2021

(65) Prior Publication Data
US 2023/0151359 A1    May 18, 2023

Related U.S. Application Data

(60) Provisional application No. 62/987,307, filed on Mar. 9, 2020.

(51) Int. Cl.
*C12N 15/11* (2006.01)
*A61P 43/00* (2006.01)
*C12N 15/86* (2006.01)

(52) U.S. Cl.
CPC .............. *C12N 15/11* (2013.01); *A61P 43/00* (2018.01); *C12N 15/86* (2013.01); *C12N 2750/14143* (2013.01); *C12N 2800/30* (2013.01)

(58) Field of Classification Search
CPC .................... C12N 15/11; C12N 15/86; C12N 2750/14143; C12N 2800/30; C12N 2830/50; A61P 43/00; A01K 2217/075; A01K 2217/206
See application file for complete search history.

(56) References Cited

U.S. PATENT DOCUMENTS

| | | |
|---|---|---|
| 2003/0073232 A1 | 4/2003 | Wilson et al. |
| 2014/0147432 A1 | 5/2014 | Bancel et al. |
| 2014/0171485 A1 | 6/2014 | Bancel et al. |
| 2017/0283887 A1 | 10/2017 | Wielscher et al. |
| 2019/0241633 A1 | 8/2019 | Fotin-Mleczek et al. |

FOREIGN PATENT DOCUMENTS

| | | |
|---|---|---|
| WO | WO 2018/226785 A1 | 12/2018 |
| WO | WO 2019/169004 A1 | 9/2019 |
| WO | WO 2020/250081 A1 | 12/2020 |
| WO | WO 2011/045765 A1 | 4/2021 |
| WO | WO 2021/077115 A1 | 4/2021 |

OTHER PUBLICATIONS

McCarty, Douglas M. ("Self-complementary AAV vectors; advances and applications." Molecular therapy 16.10 (2008): 1648-1656).*
Wong, Lee-Chin, et al. ("FOXG1-related syndrome: from clinical to molecular genetics and pathogenic mechanisms." International Journal of Molecular Sciences 20.17 (2019): 4176).*
International Search Report and Written Opinion for Application No. PCT/US2021/021358, mailed Jun. 8, 2021.
International Preliminary Report on Patentability for Application No. PCT/US2021/021358, mailed Sep. 22, 2022.
Genbank Accession No. NM_005249, Version NM_005249.5; *Homo sapiens* forkhead box G1 (FOXG1), mRNA. Feb. 9, 2020. 4 pages.
Genbank Accession No. NP_005240, Version NP_005240.3; forkhead box protein G1 [*Homo sapiens*]. Feb. 9, 2020. 3 pages.
Extended European Search Report for Application No. 21767466.2, mailed Mar. 12, 2024.

* cited by examiner

*Primary Examiner* — Kimberly Chong
(74) *Attorney, Agent, or Firm* — Wolf, Greenfield & Sacks, P.C.

(57) ABSTRACT

In some aspects the disclosure provides compositions and methods for promoting expression of functional Forkhead box G1 (FOXG1) protein in a subject. In some embodiments, the disclosure provides methods of treating a subject having FOXG1 deficiency.

15 Claims, 7 Drawing Sheets
Specification includes a Sequence Listing.

A
pAAV.CB6-PI-loxP-DsRed-loxP-EGFP
pAAVsc.U1a-loxP-DsRed-loxP-EGFP
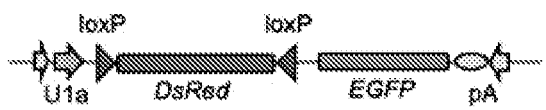
B
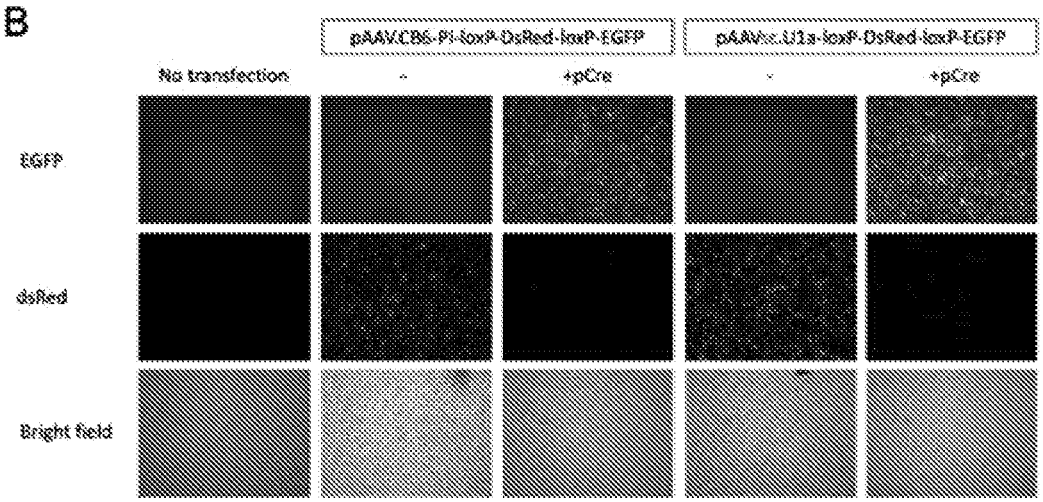
FIGs. 1A-1B

A

B

C

SEQUENCE LISTING

<160> NUMBER OF SEQ ID NOS: 14

<210> SEQ ID NO 1
<211> LENGTH: 489
<212> TYPE: PRT
<213> ORGANISM: Artificial Sequence
<220> FEATURE:
<223> OTHER INFORMATION: Synthetic

<400> SEQUENCE: 1

```
Met Leu Asp Met Gly Asp Arg Lys Glu Val Lys Met Ile Pro Lys Ser
1               5                   10                  15

Ser Phe Ser Ile Asn Ser Leu Val Pro Glu Ala Val Gln Asn Asp Asn
            20                  25                  30

His His Ala Ser His Gly His His Asn Ser His Pro Gln His His
        35                  40                  45

His His His His His His His His Pro Pro Pro Ala Pro Gln
    50                  55                  60

Pro Pro Pro Pro Gln Gln Gln Gln Pro Pro Pro Pro Pro Pro
65                  70                  75                  80

Ala Pro Gln Pro Gln Thr Arg Gly Ala Pro Ala Ala Asp Asp Asp
                85                  90                  95

Lys Gly Pro Gln Gln Leu Leu Leu Pro Pro Pro Pro Pro Pro
            100                 105                 110

Ala Ala Ala Leu Asp Gly Ala Lys Ala Asp Gly Leu Gly Gly Lys Gly
                115                 120                 125

Glu Pro Gly Gly Gly Pro Gly Glu Leu Ala Pro Val Gly Pro Asp Glu
            130                 135                 140

Lys Glu Lys Gly Ala Gly Ala Gly Gly Glu Lys Lys Gly Ala Gly
145                 150                 155                 160

Glu Gly Gly Lys Asp Gly Glu Gly Gly Lys Glu Gly Glu Lys Lys Asn
                165                 170                 175

Gly Lys Tyr Glu Lys Pro Pro Phe Ser Tyr Asn Ala Leu Ile Met Met
            180                 185                 190

Ala Ile Arg Gln Ser Pro Glu Lys Arg Leu Thr Leu Asn Gly Ile Tyr
                195                 200                 205

Glu Phe Ile Met Lys Asn Phe Pro Tyr Tyr Arg Glu Asn Lys Gln Gly
            210                 215                 220

Trp Gln Asn Ser Ile Arg His Asn Leu Ser Leu Asn Lys Cys Phe Val
225                 230                 235                 240

Lys Val Pro Arg His Tyr Asp Asp Pro Gly Lys Gly Asn Tyr Trp Met
```

```
                      245                 250                 255
Leu Asp Pro Ser Ser Asp Asp Val Phe Ile Gly Gly Thr Thr Gly Lys
                260                 265                 270
Leu Arg Arg Arg Ser Thr Thr Ser Arg Ala Lys Leu Ala Phe Lys Arg
            275                 280                 285
Gly Ala Arg Leu Thr Ser Thr Gly Leu Thr Phe Met Asp Arg Ala Gly
        290                 295                 300
Ser Leu Tyr Trp Pro Met Ser Pro Phe Leu Ser Leu His His Pro Arg
305                 310                 315                 320
Ala Ser Ser Thr Leu Ser Tyr Asn Gly Thr Thr Ser Ala Tyr Pro Ser
                325                 330                 335
His Pro Met Pro Tyr Ser Ser Val Leu Thr Gln Asn Ser Leu Gly Asn
                340                 345                 350
Asn His Ser Phe Ser Thr Ala Asn Gly Leu Ser Val Asp Arg Leu Val
            355                 360                 365
Asn Gly Glu Ile Pro Tyr Ala Thr His His Leu Thr Ala Ala Ala Leu
        370                 375                 380
Ala Ala Ser Val Pro Cys Gly Leu Ser Val Pro Cys Ser Gly Thr Tyr
385                 390                 395                 400
Ser Leu Asn Pro Cys Ser Val Asn Leu Leu Ala Gly Gln Thr Ser Tyr
                405                 410                 415
Phe Phe Pro His Val Pro His Pro Ser Met Thr Ser Gln Ser Ser Thr
                420                 425                 430
Ser Met Ser Ala Arg Ala Ala Ser Ser Thr Ser Pro Gln Ala Pro
            435                 440                 445
Ser Thr Leu Pro Cys Glu Ser Leu Arg Pro Ser Leu Pro Ser Phe Thr
        450                 455                 460
Thr Gly Leu Ser Gly Gly Leu Ser Asp Tyr Phe Thr His Gln Asn Gln
465                 470                 475                 480
Gly Ser Ser Ser Asn Pro Leu Ile His
                485

<210> SEQ ID NO 2
<211> LENGTH: 3491
<212> TYPE: DNA
<213> ORGANISM: Artificial Sequence
<220> FEATURE:
<223> OTHER INFORMATION: Synthetic

<400> SEQUENCE: 2
aattgtggct atagccgcct cgatcgctgt ctccccagcc tcgccgcggc cgctccggga      60
cgcgcccgcc cgccgcccgg ctctccccc ctttgggctg ctgctgctgc tgctgtgact     120
gctgctgcga gaggaggagg aggaggagga agcagcgggg ggggagcgg ggggtggggg     180
gggagaccaa gaagtacagt tgggagcgag ggagcttcac ccccggggcg gtggttgttt    240
ctttttttctt tctttctttt ttcttttcct ttttttttt tttctaatt cctgagggt     300
ggttgctgct tttgctacat gacttgccag cgcccgagcc tgcggtccaa ctgcgctgct    360
gccggagcgc tcagtgccgc cgctgccgcc gcgcccccc cgcgccccgtt cggcacccac    420
cggtcgccgc cgcccgccgc gccgctgtcc cgctcccgcg ccgccgccgc cgtttccccc    480
cgacgactgg gtgatgctgg acatgggaga taggaaagag gtgaaaatga tccccaagtc    540
ctcgttcagc atcaacagcc tggtgccgga ggcggtccag aacgacaacc accacgcgag    600
ccacggccac cacaacagcc accacccccca gcaccaccac caccaccacc accatcacca    660
```

-continued

```
ccacccgccg ccgcccgccc cgcaaccgcc gccgccgccg cagcagcagc agccgccgcc    720
gccgccgccc ccggcaccgc agccccccca gacgcgggc gccccggccg ccgacgacga    780
caagggcccc cagcagctgc tgctcccgcc gccgccaccg ccaccaccgg ccgccgccct    840
ggacggggct aaagcggacg ggctgggcgg caagggcgag ccgggcggcg ggccggggga    900
gctggcgccc gtcgggccgg acgagaagga gaagggcgcc ggcgccgggg gggaggagaa    960
gaaggggcg ggcgagggcg gcaaggacgg ggagggggcg aaggagggcg agaagaagaa   1020
cggcaagtac gagaagccgc cgttcagcta caacgcgctc atcatgatgg ccatccggca   1080
gagccccgag aagcggctca cgctcaacgg catctacgag ttcatcatga agaacttccc   1140
ttactaccgc gagaacaagc agggctggca gaactccatc cgccacaatc tgtccctcaa   1200
caagtgcttc gtgaaggtgc cgcgccacta cgacgacccg ggcaagggca actactggat   1260
gctggacccg tcgagcgacg acgtgttcat cggcggcacc acgggcaagc tgcggcgccg   1320
ctccaccacc tcgcgggcca agctggcctt caagcgcgt gcgcgcctca cctccaccgg   1380
cctcaccttc atggaccgcg ccggctccct ctactggccc atgtcgccct tcctgtccct   1440
gcaccacccc cgcgccagca gcactttgag ttacaacggc accacgtcgg cctaccccag   1500
ccaccccatg ccctacagct ccgtgttgac tcagaactcg ctgggcaaca accactcctt   1560
ctccaccgcc aacggcctga gcgtggaccg gctggtcaac ggggagatcc cgtacgccac   1620
gcaccactc acggccgccg cgctagccgc ctcggtgccc tgcggcctgt cggtgccctg   1680
ctctgggacc tactccctca ccccctgctc cgtcaacctg ctcgcgggcc agaccagtta   1740
ctttttcccc cacgtcccgc acccgtcaat gacttcgcag agcagcacgt ccatgagcgc   1800
cagggccgcg tcctcctcca cgtcgccgca ggccccctcg accctgccct gtgagtcttt   1860
aagaccctct ttgccaagtt ttacgacggg actgtctggg ggactgtctg attatttcac   1920
acatcaaaat cagggtctt cttccaaccc tttaatacat taacatccct gggaccagac   1980
tgtaagtgaa cgttttacac acatttgcat tgtaaatgat aattaaaaaa ataagtccag   2040
gtatttttta ttaagccccc ccctcccatt tctgtacgtt tgttcagtct ctagggttgt   2100
ttattattct aacaaggtgt ggagtgtcag cgaggtgcaa tgtggggaga atacattgta   2160
gaatataagg tttggaagtc aaattatagt agaatgtgta tctaaatagt gactgctttg   2220
ccatttcatt caaacctgac aagtctatct ctaagagccg ccagatttcc atgtgtgcag   2280
tattataagt tatcatggaa ctatatggtg gacgcagacc ttgagaacaa cctaaattat   2340
ggggagaatt ttaaaatgtt aaactgtaat ttgtatttaa aaagcattcg tagtaaaggt   2400
gcccaagaaa ttattttggc catttattgt tttgtccttt tctttaaaga actgtttttt   2460
tttcttttgt ttacttttag accaaagatt gggttctaga aaatgcactt ggtatactaa   2520
gtattaaaac aaacaaaaag gaaagttgtt tcagttggca cactgccca ttcaattgaa   2580
tcagaagggg acaaaattaa cgattgcctt cagtttgtgt tgtgtatatt ttgatgtatg   2640
tggtcactaa caggtcactt ttatttttc taaatgtagt gaaatgttaa tacctattgt   2700
acttataggt aaaccttgca aatatgtaac ctgtgttgcg caaatgccgc ataaatttga   2760
gtgattgtta atgttgtctt aaatttctt gattgtgata ctgtggtcat atgcccgtgt   2820
ttgtcactta caaaaatgtt tactatgaac acacagaaat aaaaaatagg ctaaattcat   2880
atatatcttg atacttttgt ctcttttatt aagtagagct aatttttaa agaccaatca   2940
acttataggg aattcaaagg cttttttcagc caaactaaaa tttaaactgc tcctttaatt   3000
tgaactgact ctaaaaatga aaatagtatt tttccctttg tgaacaaatt ttacaaggag   3060
```

```
cagcctattt aataaacact agctttaaac aaagtatagg cttttcagct gatacctgta    3120
agtttctgtg gatatacagc aaaaagagat ataatttaat tttctgtgca tagctcttta    3180
ccctgtgttt atttccaaat ccattaatag aatgccattt atatattttg tttcaggtat    3240
attgttaata gagcttggca aattataaat aaatatatgt atatggttag atagaagtga    3300
ctataatgca cacatatgta atatatatag acacacagag cccttcagtt caggtacaat    3360
ttgcgctatg aatgctgcaa acattttgt ttaaatattt gtatttatac tttctaagtc     3420
agcatttatt tttgtggctg tttacccaca atgaaagagt tctaataaag atgtgctgaa    3480
gttgcaatat a                                                          3491
```

<210> SEQ ID NO 3
<211> LENGTH: 1470
<212> TYPE: DNA
<213> ORGANISM: Artificial Sequence
<220> FEATURE:
<223> OTHER INFORMATION: Synthetic

<400> SEQUENCE: 3

```
atgctggaca tgggcgatag gaaggaagtc aagatgatcc ccaagagtag tttctcaatc      60
aatagcctgg tgcccgaagc cgtgcagaac gataatcacc acgccagcca cggccaccac    120
aactcccacc accctcagca ccatcatcac catcatcacc accaccacca cccacctcca    180
ccagcaccac agcctccacc ccctccacag cagcagcagc ctcctcctcc acctccacca    240 gcacccagc ctccacagac ccgcggcgcc cctgccgccg acgatgacaa gggaccacag    300
cagctgctgc tgcctcctcc acccccctcca cccccctgccg ccgccctgga tggcgccaag    360
gccgacggcc tgggaggcaa gggagagcct ggaggaggac caggcgagct ggccccagtg    420 ggcccccgatg agaaggagaa gggagcagga gcaggaggag aggagaagaa gggcgccggc    480
gagggcggca aggatggaga gggcggcaag gagggcgaga agaagaacgg caagtacgag    540
aagccaccct tctcttataa tgccctgatc atgatggcca tcagacagag ccccgagaag    600
aggctgaccc tgaacggcat ctatgagttc atcatgaaga ttttccctta ctatcgcgag    660
aacaagcagg gctggcagaa ttctatccgg cacaacctga gcctgaataa gtgcttcgtg    720
aaggtgccca gacactatga tgaccctggc aagggcaatt actggatgct ggatcccagc    780
tccgatgacg tgtttatcgg cggcaccaca ggcaagctgc ggagaaggag caccacatcc    840
agggcaaagc tggccttcaa gaggggagca aggctgacca gcacaggcct gacctttatg    900
gacagagccg ctccctgta ttggcctatg agcccattcc tgtccctgca cacccaagg    960 gcctctagca cactgagcta caacggcacc acatctgcct atcccagcca ccctatgcca   1020
tactcctctg tgctgaccca gaatagcctg gcaacaatc actcttttag cacagcaaac   1080
ggcctgtccg tggacaggct ggtgaatggc gagatcccat acgctaccca ccacctgaca   1140
gcagccgccc tggcagcatc cgtgccatgc ggcctgtccg tgccctgttc tggcacctat   1200
agcctgaacc cctgctccgt gaatctgctg gccggccaga catcttactt ctttcctcac   1260
gtgccccacc cttctatgac cagccagagc tccacatcca tgtctgccag gcagcatct   1320 agctccacct ccccacaggc cccttctaca ctgccttgtg agtccctgcg ccatccctg   1380 ccctctttta ccacaggcct gtctggcggc ctgtccgatt acttcaccca ccagaaccag   1440
ggctcctcct caaacccact gattcactaa                                      1470
```

<210> SEQ ID NO 4

<211> LENGTH: 901
<212> TYPE: DNA
<213> ORGANISM: Artificial Sequence
<220> FEATURE:
<223> OTHER INFORMATION: Synthetic

<400> SEQUENCE: 4

```
ctagtcgaca ttgattattg actagttatt aatagtaatc aattacgggg tcattagttc      60
atagcccata tatggagttc cgcgttacat aacttacggt aaatggcccg cctggctgac     120
cgcccaacga cccccgccca ttgacgtcaa taatgacgta tgttcccata gtaacgccaa     180
tagggacttt ccattgacgt caatgggtgg agtatttacg gtaaactgcc cacttggcag     240
tacatcaagt gtatcatatg ccaagtacgc cccctattga cgtcaatgac ggtaaatggc     300
ccgcctggca ttatgcccag tacatgacct tatgggactt tcctacttgg cagtacatct     360
acgtattagt catcgctatt accatgtcga ggccacgttc tgcttcactc tccccatctc     420
ccccccctcc ccaccccaa ttttgtattt atttattttt taattatttt gtgcagcgat     480
gggggcgggg ggggggggcg cgcgccaggc ggggcgggc gggcgaggg gcgggcggg     540
gcgaggcgga gaggtgcggc ggcagccaat cagagcggcg cgctccgaaa gtttcctttt     600
atggcgaggc ggcggcggcg gcggccctat aaaaagcgaa gcgcgcggcg ggcgggagca     660
agctttattg cggtagttta tcacagttaa attgctaacg cagtcagtgc ttctgacaca     720
acagtctcga acttaagctg cagaagttgg tcgtgaggca ctgggcaggt aagtatcaag     780
gttacaagac aggtttaagg agaccaatag aaactgggct tgtcgagaca gagaagactc     840
ttgcgtttct gataggcacc tattggtctt actgacatcc actttgcctt tctctccaca     900
g                                                                    901
```

<210> SEQ ID NO 5
<211> LENGTH: 251
<212> TYPE: DNA
<213> ORGANISM: Artificial Sequence
<220> FEATURE:
<223> OTHER INFORMATION: Synthetic

<400> SEQUENCE: 5

```
atggaggcgg tactatgtag atgagaattc aggagcaaac tgggaaaagc aactgcttcc      60
aaatatttgt gatttttaca gtgtagtttt ggaaaaactc ttagcctacc aattcttcta     120
agtgttttaa aatgtgggag ccagtacaca tgaagttata gagtgtttta atgaggctta     180
aatatttacc gtaactatga aatgctacgc atatcatgct gttcaggctc cgtggccacg     240
caactcatac t                                                          251
```

<210> SEQ ID NO 6
<211> LENGTH: 470
<212> TYPE: DNA
<213> ORGANISM: Artificial Sequence
<220> FEATURE:
<223> OTHER INFORMATION: Synthetic

<400> SEQUENCE: 6

```
gagggccctg cgtatgagtg caagtgggtt ttaggaccag gatgaggcgg ggtgggggtg      60
cctacctgac gaccgacccc gacccactgg acaagcaccc aaccccccatt ccccaaattg     120
cgcatcccct atcagagagg gggagggga acaggatgcg gcgaggcgcg tgcgcactgc     180
cagcttcagc accgcggaca gtgccttcgc ccccgcctgg cggcgcgcgc caccgccgcc     240
tcagcactga aggcgcgctg acgtcactcg ccggtccccc gcaaactccc cttcccggcc     300
```

| | |
|---|---|
| accttggtcg cgtccgcgcc gccgccggcc cagccggacc gcaccacgcg aggcgcgaga | 360 |
| tagggggca cgggcgcgac catctgcgct gcggcgccgg cgactcagcg ctgcctcagt | 420 |
| ctgcggtggg cagcggagga gtcgtgtcgt gcctgagagc gcagtcgaga | 470 |

<210> SEQ ID NO 7
<211> LENGTH: 363
<212> TYPE: DNA
<213> ORGANISM: Artificial Sequence
<220> FEATURE:
<223> OTHER INFORMATION: Synthetic

<400> SEQUENCE: 7

| | |
|---|---|
| acttgtggac taagtttgtt cgcatcccct tctccaaccc cctcagtaca tcaccctggg | 60 |
| ggaacagggt ccacttgctc ctgggcccac acagtcctgc agtattgtgt atataaggcc | 120 |
| agggcaaaga ggagcaggtt ttaaagtgaa aggcaggcag gtgttgggga ggcagttacc | 180 |
| ggggcaacgg gaacagggcg tttcggaggt ggttgccatg ggacctgga tgctgacgaa | 240 |
| ggctcgcgag gctgtgagca gccacagtgc cctgctcaga agccccaagc tcgtcagtca | 300 |
| agccggttct ccgtttgcac tcaggagcac gggcaggcga gtggcccta gttctggggg | 360 |
| cag | 363 |

<210> SEQ ID NO 8
<211> LENGTH: 2623
<212> TYPE: DNA
<213> ORGANISM: Artificial Sequence
<220> FEATURE:
<223> OTHER INFORMATION: Synthetic

<400> SEQUENCE: 8

| | |
|---|---|
| ctagtcgaca ttgattattg actagttatt aatagtaatc aattacgggg tcattagttc | 60 |
| atagcccata tatggagttc cgcgttacat aacttacggt aaatggcccg cctggctgac | 120 |
| cgcccaacga ccccccgccca ttgacgtcaa taatgacgta tgttcccata gtaacgccaa | 180 |
| tagggacttt ccattgacgt caatgggtgg agtatttacg gtaaactgcc cacttggcag | 240 |
| tacatcaagt gtatcatatg ccaagtacgc cccctattga cgtcaatgac ggtaaatggc | 300 |
| ccgcctggca ttatgcccag tacatgacct tatgggactt tcctacttgg cagtacatct | 360 |
| acgtattagt catcgctatt accatgtcga ggccacgttc tgcttcactc tccccatctc | 420 |
| ccccccctcc ccaccccca ttttgtattt atttattttt taattatttt gtgcagcgat | 480 |
| gggggcgggg ggggggggcg cgcgccaggc ggggcgggc ggggcgaggg gcggggcggg | 540 |
| gcgaggcgga gaggtgcggc ggcagccaat cagagcggcg cgctccgaaa gtttcctttt | 600 |
| atggcgaggc ggcggcggcg gcggccctat aaaaagcgaa gcgcgcggcg gcgggagca | 660 |
| agctttattg cggtagttta tcacagttaa attgctaacg cagtcagtgc ttctgacaca | 720 |
| acagtctcga acttaagctg cagaagttgg tcgtgaggca ctgggcaggt aagtatcaag | 780 |
| gttacaagac aggtttaagg agaccaatag aaactgggct tgtcgagaca gagaagactc | 840 |
| ttgcgtttct gataggcacc tattggtctt actgacatcc actttgcctt tctctccaca | 900 |
| ggtgtccact cccagttcaa ttacagctct aaggctaga gtacttaata cgactcacta | 960 |
| taggctagcc tcgaggccac catgctggac atgggagata ggaagaggt gaaaatgatc | 1020 |
| cccaagtcct cgttcagcat caacagcctg gtgcccgagg cggtccagaa cgacaaccac | 1080 |
| cacgcgagcc acggccacca caacagccac cacccccagc accaccacca ccaccaccac | 1140 |

```
catcaccacc acccgccgcc gcccgccccg caaccgccgc cgccgccgca gcagcagcag    1200
ccgccgccgc cgccgccccc ggcaccgcag ccccccccaga cgcggggcgc cccggccgcc    1260
gacgacgaca agggccccca gcagctgctg ctcccgccgc cgccaccgcc accaccggcc    1320
gccgccctgg acggggctaa agcggacggg ctggcggca agggcgagcc gggcggcggg    1380
ccgggggagc tggcgcccgt cgggccggac gagaaggaga agggcgccgg cgccggggg     1440 gaggagaaga aggggcggg cgagggcggc aaggacgggg aggggggcaa ggagggcgag     1500
aagaagaacg gcaagtacga aagccgccg ttcagctaca acgcgctcat catgatggcc    1560
atccggcaga gccccgagaa gcggctcacg ctcaacggca tctacgagtt catcatgaag    1620 aacttcccctt actaccgcga gaacaagcag ggctggcaga actccatccg ccacaatctg    1680
tccctcaaca agtgcttcgt gaaggtgccg cgccactacg acgacccggg caagggcaac    1740
tactggatgc tggacccgtc gagcgacgac gtgttcatcg gcggcaccac gggcaagctg    1800
cggcgccgct ccaccacctc gcgggccaag ctggccttca gcgcggtgc gcgcctcacc     1860 tccaccggcc tcaccttcat ggaccgcgcc ggctccctct actggcccat gtcgcccttc    1920
ctgtccctgc accaccccg cgccagcagc actttgagtt acaacggcac cacgtcggcc    1980
taccccagcc accccatgcc ctacagctcc gtgttgactc agaactcgct gggcaacaac    2040
cactccttct ccaccgccaa cggcctgagc gtggaccggc tggtcaacgg ggagatcccg    2100
tacgccacgc accacctcac ggccgccgcg ctagccgcct cggtgccctg cggcctgtcg    2160
gtgccctgct ctgggaccta ctccctcaac ccctgctccg tcaacctgct cgcgggccag    2220
accagttact ttttccccca cgtccccgcac ccgtcaatga cttcgcagag cagcacgtcc    2280
atgagcgcca gggccgcgtc ctcctccacg tcgccgcagg cccctcgac cctgccctgt    2340 gagtctttaa gaccctcttt gccaagtttt acgacgggac tgtctgggg actgtctgat    2400 tatttcacac atcaaaatca ggggtcttct tccaaccctt taatacatta aggtacctct    2460
agagtcgagg acggggtgaa ctacgcctga ggatccgatc tttttccctc tgccaaaaat    2520
tatggggaca tcatgaagcc ccttgagcat ctgacttctg gctaataaag gaaatttatt    2580
ttcattgcaa tagtgtgttg gaattttttg tgtctctcac tcg                      2623
```

<210> SEQ ID NO 9
<211> LENGTH: 2623
<212> TYPE: DNA
<213> ORGANISM: Artificial Sequence
<220> FEATURE:
<223> OTHER INFORMATION: Synthetic

<400> SEQUENCE: 9

```
ctagtcgaca ttgattattg actagttatt aatagtaatc aattacgggg tcattagttc      60
atagcccata tatggagttc cgcgttacat aacttacggt aaatggcccg cctggctgac     120
cgcccaacga cccccgccca ttgacgtcaa taatgacgta tgttcccata gtaacgccaa     180
tagggacttt ccattgacgt caatgggtgg agtatttacg gtaaactgcc cacttggcag     240
tacatcaagt gtatcatatg ccaagtacgc cccctattga cgtcaatgac ggtaaatggc     300
ccgcctggca ttatgcccag tacatgacct tatgggactt tcctacttgg cagtacatct     360
acgtattagt catcgctatt accatgtcga ggccacgttc tgcttcactc tccccatctc     420 cccccctcc ccaccccaa ttttgtattt atttatttt taattatttt gtgcagcgat       480 ggggcgggg gggggggcg cgcgccaggc ggggcgggc gggcgagggc gcggggcggg       540
gcgaggcgga gaggtgcggc ggcagccaat cagagcggcg cgctccgaaa gtttcctttt    600
```

```
atggcgaggc ggcggcggcg gcggccctat aaaaagcgaa gcgcgcggcg ggcgggagca    660
agctttattg cggtagttta tcacagttaa attgctaacg cagtcagtgc ttctgacaca    720
acagtctcga acttaagctg cagaagttgg tcgtgaggca ctgggcaggt aagtatcaag    780
gttacaagac aggtttaagg agaccaatag aaactgggct tgtcgagaca gagaagactc    840
ttgcgtttct gataggcacc tattggtctt actgacatcc actttgcctt tctctccaca    900
ggtgtccact cccagttcaa ttacagctct taaggctaga gtacttaata cgactcacta    960
taggctagcc tcgaggccac catgctggac atgggcgata ggaaggaagt caagatgatc   1020
cccaagagta gtttctcaat caatagcctg gtgcccgaag ccgtgcagaa cgataatcac   1080
cacgccagcc acggccacca caactcccac cacccctcagc accatcatca ccatcatcac   1140
caccaccacc ccccacctcc accagcacca cagcctccac ccctccaca gcagcagcag   1200 cctcctcctc cacctccacc agcaccccag cctccacaga cccgcggcgc ccctgccgcc   1260
gacgatgaca agggaccaca gcagctgctg ctgcctcctc cacccctcc accccctgcc   1320 gccgccctgg atggcgccaa ggccgacggc ctgggaggca agggagagcc tggaggagga   1380
ccaggcgagc tggccccagt gggcccccgat gagaaggaga agggagcagg agcaggagga   1440
gaggagaaga agggcgccgg cgagggcggc aaggatggag agggcggcaa ggagggcgag   1500
aagaagaacg gcaagtacga gaagccaccc ttctcttata tgccctgat catgatggcc   1560 atcagacaga gccccgagaa gaggctgacc ctgaacggca tctatgagtt catcatgaag   1620
aattttcctt actatcgcga gaacaagcag ggctggcaga attctatccg gcacaacctg   1680
agcctgaata agtgcttcgt gaaggtgccc agacactatg atgaccctgg caagggcaat   1740
tactggatgc tggatcccag ctccgatgac gtgtttatcg gcggcaccac aggcaagctg   1800
cggagaagga gcaccacatc cagggcaaag ctggccttca gaggggagc aaggctgacc   1860 agcacaggcc tgacctttat ggacagagcc ggctccctgt attggcctat gagcccattc   1920
ctgtccctgc accacccaag ggcctctagc acactgagct acaacggcac acatctgcc   1980 tatcccagcc accctatgcc atactcctct gtgctgaccc agaatagcct gggcaacaat   2040
cactctttta gcacagcaaa cggcctgtcc gtggacaggc tggtgaatgg cgagatccca   2100
tacgctaccc accacctgac agcagccgcc ctggcagcat ccgtgccatg cggcctgtcc   2160
gtgccctgtt ctggcaccta tagcctgaac ccctgctccg tgaatctgct ggccggccag   2220
acatcttact tctttcctca cgtgccccac ccttctatga ccagccagag ctccacatcc   2280
atgtctgcca gggcagcatc tagctccacc tccccacagg ccccttctac actgccttgt   2340
gagtccctgc ggccatccct gccctctttt accacaggcc tgtctggcgg cctgtccgat   2400
tacttcaccc accagaacca gggctcctcc tcaaacccac tgattcacta aggtacctct   2460
agagtcgagg acggggtgaa ctacgcctga ggatccgatc tttttccctc tgccaaaaat   2520 tatgggggaca tcatgaagcc ccttgagcat ctgacttctg gctaataaag gaaatttatt   2580
ttcattgcaa tagtgtgttg gaattttttg tgtctctcac tcg                    2623
```

<210> SEQ ID NO 10
<211> LENGTH: 1866
<212> TYPE: DNA
<213> ORGANISM: Artificial Sequence
<220> FEATURE:
<223> OTHER INFORMATION: Synthetic

<400> SEQUENCE: 10

| | |
|---|---:|
| atggaggcgg tactatgtag atgagaattc aggagcaaac tgggaaaagc aactgcttcc | 60 |
| aaatatttgt gattttttaca gtgtagtttt ggaaaaactc ttagcctacc aattcttcta | 120 |
| agtgttttaa aatgtgggag ccagtacaca tgaagttata gagtgtttta atgaggctta | 180 |
| aatatttacc gtaactatga aatgctacgc atatcatgct gttcaggctc cgtggccacg | 240 |
| caactcatac taccggtgcc accatgctgg acatgggaga taggaaagag gtgaaaatga | 300 |
| tccccaagtc ctcgttcagc atcaacagcc tggtgcccga gcggtccag aacgacaacc | 360 |
| accacgcgag ccacggccac cacaacagcc accacccca gcaccaccac caccaccacc | 420 |
| accatcacca ccaccgccg ccgcccgccc cgcaaccgcc gccgccgccg cagcagcagc | 480 |
| agccgccgcc gccgccgccc ccggcaccgc agccccccca gacgcggggc gccccggccg | 540 |
| ccgacgacga caagggcccc cagcagctgc tgctcccgcc gccgccaccg ccaccaccgg | 600 |
| ccgccgccct ggacggggct aaagcggacg ggctgggcgg caagggcgag ccgggcggcg | 660 |
| ggccggggga gctggcgccc gtcgggccgg acgagaagga gaagggcgcc ggcgccgggg | 720 |
| gggaggagaa gaaggggggcg ggcgagggcg gcaaggacgg ggagggggggc aaggagggcg | 780 |
| agaagaagaa cggcaagtac gagaagccgc cgttcagcta caacgcgctc atcatgatgg | 840 |
| ccatccggga gagccccgag aagcggctca cgctcaacgg catctacgag ttcatcatga | 900 |
| agaacttccc ttactaccgc gagaacaagc agggctggca gaactccatc cgccacaatc | 960 |
| tgtccctcaa caagtgcttc gtgaaggtgc cgcgccacta cgacgacccg ggcaagggca | 1020 |
| actactggat gctggacccg tcgagcgacg acgtgttcat cggcggcacc acgggcaagc | 1080 |
| tgcgcgcgcc ctccaccacc tcgcgggcca agctggcctt caagcgcggt gcgcgcctca | 1140 |
| cctccaccgg cctcaccttc atggaccgcg ccggctccct ctactggccc atgtcgccct | 1200 |
| tcctgtccct gcaccacccc cgcgccagca gcactttgag ttacaacggc accacgtcgg | 1260 |
| cctaccccag ccaccccatg ccctacagct ccgtgttgac tcagaactcg ctgggcaaca | 1320 |
| accactcctt ctccaccgcc aacggcctga gcgtggaccg gctggtcaac ggggagatcc | 1380 |
| cgtacgccac gcaccacctc acggccgccg cgctagccgc ctcggtgccc tgcggcctgt | 1440 |
| cggtgccctg ctctgggacc tactccctca cccctgctc cgtcaacctg ctcgcgggcc | 1500 |
| agaccagtta cttttttccc cacgtcccgc accgtcaat gacttcgcag agcagcacgt | 1560 |
| ccatgagcgc cagggccgcg tcctcctcca cgtcgccgca ggcccctcg accctgccct | 1620 |
| gtgagtcttt aagaccctct ttgccaagtt ttacgacggg actgtctggg ggactgtctg | 1680 |
| attatttcac acatcaaaat cagggtctct cttccaaccc tttaatacat taaggatccg | 1740 |
| atcttttttcc ctctgccaaa aattatgggg acatcatgaa gccccttgag catctgactt | 1800 |
| ctggctaata aaggaaattt attttcattg caatagtgtg ttggaatttt ttgtgtctct | 1860 |
| cactcg | 1866 |

<210> SEQ ID NO 11
<211> LENGTH: 1866
<212> TYPE: DNA
<213> ORGANISM: Artificial Sequence
<220> FEATURE:
<223> OTHER INFORMATION: Synthetic

<400> SEQUENCE: 11

| | |
|---|---:|
| atggaggcgg tactatgtag atgagaattc aggagcaaac tgggaaaagc aactgcttcc | 60 |
| aaatatttgt gattttttaca gtgtagtttt ggaaaaactc ttagcctacc aattcttcta | 120 |
| agtgttttaa aatgtgggag ccagtacaca tgaagttata gagtgtttta atgaggctta | 180 |

```
aatatttacc gtaactatga aatgctacgc atatcatgct gttcaggctc cgtggccacg    240
caactcatac taccggtgcc accatgctgg acatgggcga taggaaggaa gtcaagatga    300
tccccaagag tagtttctca atcaatagcc tggtgcccga agccgtgcag aacgataatc    360
accacgccag ccacggccac cacaactccc accaccctca gcaccatcat caccatcatc    420
accaccacca cacccaccct ccaccagcac cacagcctcc acccctcca cagcagcagc     480 agcctcctcc tccacctcca ccagcacccc agcctccaca gacccgcggc gcccctgccg    540
ccgacgatga caagggacca cagcagctgc tgctgcctcc tccacccct ccacccctg      600 ccgccgccct ggatggcgcc aaggccgacg gcctggagg caaggagag cctggaggag      660 gaccaggcga gctggcccca gtgggccccg atgagaagga aagggagca ggagcaggag     720 gagaggagaa aagggcgcc ggcgagggcg gcaaggatgg agaggcggc aaggagggcg      780 agaagaagaa cggcaagtac gagaagccac ccttctctta taatgccctg atcatgatgg    840
ccatcagaca gagccccgag aagaggctga ccctgaacgg catctatgag ttcatcatga    900
agaattttcc ttactatcgc gagaacaagc agggctggca gaattctatc cggcacaacc    960
tgagcctgaa taagtgcttc gtgaaggtgc ccagacacta tgatgaccct ggcaagggca   1020
attactggat gctggatccc agctccgatg acgtgtttat cggcggcacc acaggcaagc   1080
tgcggagaag gagcaccaca tccagggcaa agctggcctt caagaggga gcaaggctga    1140 ccagcacagg cctgaccttt atggacagag ccggctccct gtattggcct atgagcccat   1200
tcctgtccct gcaccaccca agggcctcta gcacactgag ctacaacggc accacatctg   1260
cctatcccag ccaccctatg ccatactcct ctgtgctgac ccagaatagc ctgggcaaca   1320
atcactcttt tagcacagca aacggcctgt ccgtggacag gctggtgaat ggcgagatcc   1380
catacgctac ccaccacctg acagcagccg ccctggcagc atccgtgcca tgcggcctgt   1440
ccgtgccctg ttctggcacc tatagcctga cccctgctc cgtgaatctg ctggccggcc    1500
agacatctta cttctttcct cacgtgcccc acccttctat gaccagccag agctccacat   1560
ccatgtctgc cagggcagca tctagctcca cctccccaca ggccccttct acactgcctt   1620
gtgagtccct gcggccatcc ctgccctctt ttaccacagg cctgtctggc ggcctgtccg   1680
attacttcac ccaccagaac cagggctcct cctcaaaccc actgattcac taaggatccg   1740 atcttttttcc ctctgccaaa aattatgggg acatcatgaa gccccttgag catctgactt   1800
ctggctaata aaggaaattt attttcattg caatagtgtg ttggaatttt ttgtgtctct    1860
cactcg                                                             1866
```

<210> SEQ ID NO 12
<211> LENGTH: 2085
<212> TYPE: DNA
<213> ORGANISM: Artificial Sequence
<220> FEATURE:
<223> OTHER INFORMATION: Synthetic

<400> SEQUENCE: 12

```
gagggccctg cgtatgagtg caagtgggtt ttaggaccag gatgaggcgg ggtgggggtg      60
cctacctgac gaccgacccc gacccactgg acaagcaccc aaccccatt ccccaaattg     120 cgcatcccct atcagagagg gggagggaa acaggatgcg gcgaggcgcg tgcgcactgc     180
cagcttcagc accgcggaca gtgccttcgc ccccgcctgg cggcgcgcgc caccgccgcc    240
tcagcactga aggcgcgctg acgtcactcg ccggtccccc gcaaactccc cttcccggcc    300
```

```
accttggtcg cgtccgcgcc gccgccggcc cagccggacc gcaccacgcg aggcgcgaga    360 tagggggca cgggcgcgac catctgcgct gcggcgccgg cgactcagcg ctgcctcagt     420
ctgcggtggg cagcggagga gtcgtgtcgt gcctgagagc gcagtcgaga accggtgcca    480
ccatgctgga catgggcgat aggaaggaag tcaagatgat ccccaagagt agtttctcaa    540
tcaatagcct ggtgcccgaa gccgtgcaga acgataatca ccacgccagc cacggccacc    600
acaactccca ccaccctcag caccatcatc accatcatca ccaccaccac cacccacctc    660
caccagcacc acagcctcca cccctccac agcagcagca gcctcctcct ccacctccac      720
cagcacccca gcctccacag acccgcggcg ccctgccgc cgacgatgac aagggaccac     780
agcagctgct gctgcctcct ccacccctc cacccctgc cgccgccctg gatggcgcca     840
aggccgacgg cctgggaggc aagggagagc ctggaggagg accaggcgag ctggccccag    900
tgggccccga tgagaaggag aagggagcag gagcaggagg agaggagaag aagggcgccg    960
gcgagggcgg caaggatgga gagggcggca aggagggcga gaagaagaac ggcaagtacg   1020
agaagccacc cttctcttat aatgccctga tcatgatggc catcagacag agccccgaga   1080
agaggctgac cctgaacggc atctatgagt tcatcatgaa gaattttcct tactatcgcg   1140
agaacaagca gggctggcag aattctatcc ggcacaacct gagcctgaat aagtgcttcg   1200
tgaaggtgcc cagacactat gatgaccctg gcaagggcaa ttactggatg ctggatccca   1260
gctccgatga cgtgtttatc ggcggcacca caggcaagct gcggagaagg agcaccacat   1320
ccagggcaaa gctggccttc aagaggggag caaggctgac cagcacaggc ctgaccttta   1380
tggacagagc cggctcctg tattggccta tgagcccatt cctgtccctg caccacccaa   1440
gggcctctag cacactgagc tacaacggca ccacatctgc ctatcccagc caccctatgc    1500
catactcctc tgtgctgacc cagaatagcc tgggcaacaa tcactctttt agcacagcaa    1560
acggcctgtc cgtggacagg ctggtgaatg gcgagatccc atacgctacc caccacctga    1620
cagcagccgc cctggcagca tccgtgccat gcggcctgtc cgtgccctgt tctggcacct    1680
atagcctgaa cccctgctcc gtgaatctgc tggccggcca gacatcttac ttcttttcctc   1740 acgtgccca cccttctatg accagccaga gctccacatc catgtctgcc agggcagcat    1800
ctagctccac ctccccacag gccccttcta cactgccttg tgagtccctg cggccatccc    1860
tgccctcttt taccaggc ctgtctggcg gcctgtccga ttacttcacc caccagaacc     1920
agggctcctc ctcaaaccca ctgattcact aaggatccga tcttttcccc tctgccaaaa    1980
attatgggga catcatgaag ccccttgagc atctgacttc tggctaataa aggaaattta    2040
ttttcattgc aatagtgtgt tggaattttt tgtgtctctc actcg                    2085
```

<210> SEQ ID NO 13
<211> LENGTH: 1978
<212> TYPE: DNA
<213> ORGANISM: Artificial Sequence
<220> FEATURE:
<223> OTHER INFORMATION: Synthetic

<400> SEQUENCE: 13

```
acttgtggac taagtttgtt cgcatcccct tctccaaccc cctcagtaca tcaccctggg     60
ggaacagggt ccacttgctc ctgggcccac acagtcctgc agtattgtgt atataaggcc    120
agggcaaaga ggagcaggtt ttaaagtgaa aggcaggcag gtgttgggga ggcagttacc    180
ggggcaacgg gaacagggcg tttcggaggt ggttgccatg ggacctgga tgctgacgaa    240 ggctcgcgag gctgtgagca gccacagtgc cctgctcaga agccccaagc tcgtcagtca    300
```

```
agccggttct ccgtttgcac tcaggagcac gggcaggcga gtggccccta gttctggggg    360
cagaccggtg ccaccatgct ggacatgggc gataggaagg aagtcaagat gatccccaag    420
agtagtttct caatcaatag cctggtgccc gaagccgtgc agaacgataa tcaccacgcc    480
agccacggcc accacaactc ccaccaccct cagcaccatc atcaccatca tcaccaccac    540
caccacccac ctccaccagc accacagcct caccccctc cacagcagca gcagcctcct     600
cctccacctc caccagcacc ccagcctcca cagacccgcg gcgcccctgc cgccgacgat    660
gacaagggac cacagcagct gctgctgcct cctccacccc ctccacccc tgccgccgcc     720 ctggatggcg ccaaggccga cggcctggga ggcaagggag agcctggagg aggaccaggc    780
gagctggccc cagtgggccc cgatgagaag gagaagggag caggagcagg aggagaggag    840
aagaagggcg ccggcgaggg cggcaaggat ggagagggcg gcaaggaggg cgagaagaag    900
aacggcaagt acgagaagcc acccttctct tataatgccc tgatcatgat ggccatcaga    960
cagagccccg agaagaggct gaccctgaac ggcatctatg agttcatcat gaagaatttt    1020
ccttactatc gcgagaacaa gcagggctgg cagaattcta tccggcacaa cctgagcctg    1080
aataagtgct tcgtgaaggt gcccagacac tatgatgacc ctggcaaggg caattactgg    1140
atgctggatc ccagctccga tgacgtgttt atcggcggca ccacaggcaa gctgcgcgaga   1200 aggagcacca catccagggc aaagctggcc ttcaagaggg gagcaaggct gaccagcaca    1260
ggcctgacct ttatggacag agccggctcc ctgtattggc ctatgagccc attcctgtcc    1320
ctgcaccacc caagggcctc tagcacactg agctacaacg gcaccacatc tgcctatccc    1380
agccacccta tgccatactc ctctgtgctg acccagaata gcctgggcaa caatcactct    1440
tttagcacag caaacggcct gtccgtgac aggctggtga atggcgagat cccatacgct    1500
acccaccacc tgacagcagc cgccctggca gcatccgtgc catgcggcct gtccgtgccc    1560
tgttctggca cctatagcct gaaccctgc tccgtgaatc tgctggccgg ccagacatct    1620
tacttctttc ctcacgtgcc ccacccttct atgaccagcc agagctccac atccatgtct    1680
gccagggcag catctagctc cacctcccca caggccccctt ctacactgcc ttgtgagtcc    1740
ctgcggccat ccctgccctc ttttaccaca ggcctgtctg gcggcctgtc cgattacttc    1800
acccaccaga accagggctc ctcctcaaac ccactgattc actaaggatc cgatctttt    1860 ccctctgcca aaaattatgg ggacatcatg aagccccttg agcatctgac ttctggctaa    1920
taaaggaaat ttattttcat tgcaatagtg tgttggaatt ttttgtgtct ctcactcg     1978
```

<210> SEQ ID NO 14
<211> LENGTH: 141
<212> TYPE: DNA
<213> ORGANISM: Artificial Sequence
<220> FEATURE:
<223> OTHER INFORMATION: Synthetic

<400> SEQUENCE: 14

```
cctgcaggca gctgcgcgct cgctcgctca ctgaggccgc ccgggcaaag cccgggcgtc     60
gggcgacctt tggtcgcccg gcctcagtga gcgagcgagc gcgcagagag ggagtggcca    120
actccatcac tagggggttcc t                                              141
```

GENE REPLACEMENT THERAPY FOR FOXG1 SYNDROME

RELATED APPLICATIONS

This application is a national stage filing under 35 U.S.C. § 371 of international PCT application PCT/US2021/021358, filed Mar. 8, 2021, which claims priority under 35 U.S.C. § 119(e) to U.S. provisional patent application, U.S. Ser. No. 62/987,307, filed Mar. 9, 2020, the entire contents of each of which are incorporated by reference herein.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Sep. 8, 2022, is named U012070138US01-SEQ-KZM and is 32,733 bytes in size.

BACKGROUND

FOXG1 syndrome is a severe neurodevelopmental disorder caused by haploinsufficiency of the Forkhead box G1 (FOXG1) gene. Patients present early on in childhood with neurodevelopmental signs and symptoms such as cranial and cerebral anatomical defects, including abnormal myelination, seizures, and mental retardation. No curative treatment is currently available.

SUMMARY

Aspects of the disclosure relate to compositions and methods for promoting expression of functional Forkhead box G1 (FOXG1) protein in a cell or subject. The disclosure is based, in part, on methods for treating a subject having FOXG1 deficiency.

Accordingly, in some aspects, the disclosure provides an isolated nucleic acid comprising the nucleic acid sequence set forth in any one of SEQ ID NOs: 3 and 8-13. In some embodiments, a nucleic acid encodes a protein comprising the amino acid sequence set forth in SEQ ID NO: 1.

In some embodiments, an isolated nucleic acid comprises a promoter that is operably linked to the nucleic acid sequence set forth in any one of SEQ ID NOs: 3 and 8-13. In some embodiments, a promoter comprises a chicken beta-actin (CB) promoter, a U1a promoter, or a neuron-specific promoter. In some embodiments, a neuron-specific promoter comprises a human synapsin 1 (hSyn1) promoter or a human Ca 2+/calmodulin-dependent protein kinase II (hCAMKII) promoter. In some embodiments, a promoter comprises the sequence set forth in any one of SEQ ID NOs: 4-7.

In some embodiments, an isolated nucleic acid further comprises one or more adeno-associated virus (AAV) inverted terminal repeats (ITRs). In some embodiments, AAV ITRs are AAV2 ITRs. In some embodiments, at least one of the AAV2 ITRs comprises the sequence set forth in SEQ ID NO: 14. In some embodiments, at least one AAV ITR is a truncated ITR (ΔITR).

In some aspects, the disclosure provides a recombinant adeno-associated virus (rAAV) comprising an isolated nucleic acid as described herein, and at least one AAV capsid protein. In some embodiments, an AAV capsid protein is an AAV9 capsid protein or an AAV·PHP-eB capsid protein.

In some aspects, the disclosure provides an isolated nucleic acid comprising an expression cassette having a transgene that encodes a Forkhead box G1 (FOXG1) protein flanked by adeno-associated virus (AAV) inverted terminal repeats (ITRs). In some embodiments, a FOXG1 protein comprises the amino acid sequence set forth in SEQ ID NO: 1.

In some embodiments, a transgene comprises a nucleic acid sequence that is at least 70% identical to the nucleic acid sequence set forth in SEQ ID NO: 2. In some embodiments, a transgene comprises a codon-optimized nucleic acid sequence. In some embodiments, a transgene comprises the nucleic acid sequence set forth in any one of SEQ ID NOs: 3 and 8-13.

In some embodiments, an expression cassette comprises a promoter operably linked to the transgene. In some embodiments, a promoter is a constitutive promoter, inducible promoter, or tissue-specific promoter. In some embodiments, a promoter comprises a chicken beta-actin promoter a U1a promoter, or a neuron-specific promoter. In some embodiments, a neuron-specific promoter comprises a human synapsin 1 (hSyn1) promoter or a human Ca 2+/calmodulin-dependent protein kinase II (hCAMKII) promoter. In some embodiments, a promoter comprises the sequence set forth in any one of SEQ ID NOs: 4-7.

In some embodiments, an AAV ITR is an AAV2 ITR. In some embodiments, at least one of the AAV2 ITRs comprises the sequence set forth in SEQ ID NO: 14. In some embodiments, at least one AAV ITR is a ΔITR.

In some aspects, the disclosure provides a vector comprising an isolated nucleic acid as described herein. In some embodiments, a vector is a plasmid.

In some embodiments, the disclosure provides a recombinant adeno-associated virus (rAAV) comprising an isolated nucleic acid as described herein; and at least one AAV capsid protein.

In some embodiments, an rAAV is a self-complementary AAV (scAAV).

In some embodiments, at least one AAV capsid protein has a tropism for central nervous system (CNS) cells. In some embodiments, the CNS cells are telencephalon cells or neurons.

In some embodiments, at least one capsid protein of an rAAV is selected from AAV1, AAV2, AAV3, AAV4, AAV5, AAV6, AAB7, AAV8, AAV9, AAV·PHP-eB, or a variant of any of the foregoing.

In some aspects, the disclosure provides a pharmaceutical composition comprising an isolated nucleic acid or rAAV as described herein and a pharmaceutically acceptable excipient.

In some aspects, the disclosure provides a host cell comprising an isolated nucleic acid or rAAV of as described herein. In some embodiments, a host cell is a bacterial cell, a mammalian cell, or an insect cell. In some embodiments, a mammalian cell is a CNS cell.

In some aspects, the disclosure provides a method for treating FOXG1 deficiency in a subject in need thereof, the method comprising administering to the cell an isolated nucleic acid, rAAV, or pharmaceutical composition as described herein, in an amount effective to increase FOXG1 expression in in the subject.

In some embodiments, a subject is a human subject. In some embodiments, a subject has one or more mutations in a FOXG1 gene. In some embodiments, an rAAV is administered to a subject by injection.

In some aspects, the disclosure provides a method for delivering a transgene to a cell, the method comprising administering to the cell an isolated nucleic acid, the rAAV, or pharmaceutical composition as described herein.

In some embodiments, the cell is in a subject. In some embodiments, the subject is a mammalian subject. In some embodiments, the subject is a human subject.

In some embodiments, the cell is a central nervous system cell. In some embodiments, the cell is a telencephalon cell.

In some embodiments, the administering comprises injection of the isolated nucleic acid, rAAV, or pharmaceutical composition into the subject. In some embodiments, the injection comprises intravenous injection or injection directly into the central nervous system.

BRIEF DESCRIPTION OF DRAWINGS

FIGS. 1A-1B show iEGFP reporter design and validation. FIG. 1A shows two examples of designs for single-stranded and self-complementary AAV (scAAV) genomes. In both designs, DsRed is expressed and blocks EGFP expression in the absence of a Cre recombinase. In the presence of Cre, recombination occurs between the two loxP sites to excise the DsRed gene, therefore allowing for EGFP expression. FIG. 1B shows validation of the iEGFP reporter designs in HEK293 cells.

FIG. 2A shows examples of vector designs for human FOXG1 transgene. FIG. 2B shows examples of vector designs for codon optimized human FOXG1 transgene driven by CB6 or U1 promoter. FIG. 2C shows examples of vector designs or codon optimized human FOXG1 transgene driven by neuron-specific promoters.

FIG. 5A shows immunofluorescence staining of myelin binding protein (MBP) revealed reduced corpus callosum (CC) size in the Foxg1$^{+/-}$ mice, and treatment with vector #2 partially restored CC size.

FIG. 5B shows representative data for immunofluorescence staining of TBR1 (a cortical neuronal marker) revealed reduced cortical neuron numbers in the Foxg1$^{+/-}$ mice, and treatment with vector #2 partially restored the cortical neuron counts.

FIG. 6A shows a schematic of the experimental design. FIG. 6B shows representative data relating to measurement of telencephalon length and width.

DETAILED DESCRIPTION

Figure 2A:
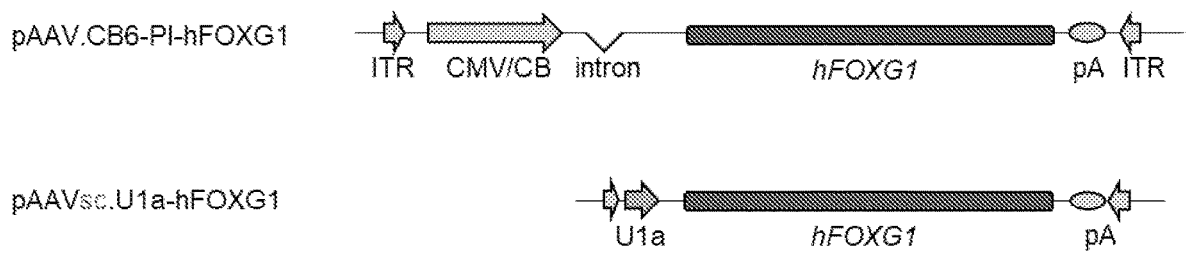
FIGS. 2A-2C show examples of FOXG1 vector designs.

Aspects of the disclosure relate to compositions and methods for promoting expression of functional Forkhead box G1 (FOXG1) protein in a cell or subject. The disclosure is based, in part, on methods for treating a subject having FOXG1 deficiency.

Forkhead Box G1 (FOXG1)

Aspects of the disclosure relate to compositions (e.g., isolated nucleic acids, vectors such as rAAV vectors, rAAVs, etc.) that encode a Forkhead box G1 (FOXG1) protein. FOXG1 protein is a transcription factor that is characterized by a distinct forkhead domain and plays a role in the development of the brain and telencephalon. Mutations in FOXG1 are associated with a FOXG1 syndrome, a severe neurological disease characterized by microcephaly and brain malformations, and severe cognitive and developmental deficiencies. In humans, Forkhead box G1 is encoded by a FOXG1 gene, for example as set forth in NCBI Reference Sequence No. NM_005249.5. In some embodiments, a FOXG1 protein comprises the amino acid sequence set forth in NCBI Reference Sequence No. NP_005240.3. In some embodiments, a FOXG1 protein comprises the amino acid sequence set forth in SEQ ID NO: 1. In some embodiments, a FOXG1 protein comprises an amino acid sequence that is at least 50%, 60%, 70%, 75%, 80%, 90%, 95%, or 99% identical to the amino acid sequence set forth in SEQ ID NO: 1.

In some aspects, the disclosure relates to isolated nucleic acids comprising an expression cassette having a transgene that encodes a FOXG1 protein. In some embodiments, an isolated nucleic acid encoding a FOXG1 protein comprises the nucleic acid sequence set forth in NCBI Reference Sequence No. NM_005249.5. In some embodiments, an isolated nucleic acid encoding a FOXG1 protein comprises a nucleic acid sequence that is at least 70%, 75%, 80%, 90%, 95%, or 99% identical to the nucleic acid sequence set forth in NCBI Reference Sequence No. NM_005249.5. In some embodiments, an isolated nucleic acid encoding a FOXG1 protein comprises a nucleic acid sequence that is at least 70%, 75%, 80%, 90%, 95%, or 99% identical to the nucleic acid sequence set forth in SEQ ID NO: 2. In some embodiments, an isolated nucleic acid encoding a FOXG1 protein comprises at least one (e.g., 1, 2, 3, 4, 5, 10, 15, 20, 25, 50, 100, 150, 200, 250, or more) nucleotide substitutions, insertions, deletions, or any combination thereof, relative to the nucleic acid sequence set forth in NCBI Reference Sequence No. NM_005249.5. In some embodiments, an isolated nucleic acid encoding a FOXG1 protein comprises a codon-optimized nucleic acid sequence. In some embodiments an isolated nucleic acid encoding a FOXG1 protein comprises (or consists of) the amino acid sequence set forth in SEQ ID NO: 3. In some embodiments an isolated nucleic acid encoding a FOXG1 protein comprises (or consists of) the amino acid sequence set forth in SEQ ID NO: 8. In some embodiments an isolated nucleic acid encoding a FOXG1 protein comprises (or consists of) the amino acid sequence set forth in SEQ ID NO: 9. In some embodiments an isolated nucleic acid encoding a FOXG1 protein comprises (or consists of) the amino acid sequence set forth in SEQ ID NO: 10. In some embodiments an isolated nucleic acid encoding a FOXG1 protein comprises (or consists of) the amino acid sequence set forth in SEQ ID NO: 11. In some embodiments an isolated nucleic acid encoding a FOXG1 protein comprises (or consists of) the amino acid sequence set forth in SEQ ID NO: 12. In some embodiments an isolated nucleic acid encoding a FOXG1 protein comprises (or consists of) the amino acid sequence set forth in SEQ ID NO: 13.

A "nucleic acid" sequence refers to a DNA or RNA sequence. In some embodiments, proteins and nucleic acids of the disclosure are isolated. As used herein, the term "isolated" means artificially produced. As used herein, with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

The isolated nucleic acids of the disclosure may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise a region encoding, for example, a protein and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the disclosure is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid further comprises a region (e.g., a second region, a third region, a fourth region, etc.) comprising a second AAV ITR. In some embodiments, an isolated nucleic acid encoding a transgene is flanked by AAV ITRs (e.g., in the orientation 5'-ITR-transgene-ITR-3'). In some embodiments, the AAV ITRs are AAV2 ITRs. In some embodiments, an AAV2 ITR comprises the sequence set forth in SEQ ID NO: 14 In some embodiments, at least one AAV ITR is a truncated AAV ITR, for example a ΔITR as described, for example by McCarty (2008) *Molecular Therapy* 16(10): 1648-1656.

In addition to the major elements identified above for the recombinant AAV vector, the vector also includes conventional control elements which are operably linked with elements of the transgene in a manner that permits its transcription, translation and/or expression in a cell transfected with the vector or infected with the virus produced by the disclosure. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (e.g., Kozak consensus sequence); sequences that enhance protein stability; and when desired, sequences that enhance secretion of the encoded product. A number of expression control sequences, including promoters which are native, constitutive, inducible and/or tissue-specific, are known in the art and may be utilized.

As used herein, a nucleic acid sequence (e.g., coding sequence) and regulatory sequences are said to be operably linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame. In some embodiments, operably linked coding sequences yield a fusion protein.

A region comprising a transgene (e.g., a transgene encoding a FOXG1 protein, etc.) may be positioned at any suitable location of the isolated nucleic acid that will enable expression of the at least one transgene, the selectable marker protein, or reporter protein.

It should be appreciated that in cases where a transgene encodes more than one gene product (e.g., a FOXG1 protein and another protein or interfering nucleic acid), each gene product may be positioned in any suitable location within the transgene. For example, a nucleic acid encoding a first polypeptide may be positioned in an intron of the transgene and a nucleic acid sequence encoding a second polypeptide may be positioned in another untranslated region (e.g., between the last codon of a protein coding sequence and the first base of the poly-A signal of the transgene).

A "promoter" refers to a DNA sequence recognized by the synthetic machinery of the cell, or introduced synthetic machinery, required to initiate the specific transcription of a gene. The phrases "operatively linked," "operatively positioned," "under control" or "under transcriptional control" means that the promoter is in the correct location and orientation in relation to the nucleic acid to control RNA polymerase initiation and expression of the gene.

For nucleic acids encoding proteins, a polyadenylation sequence generally is inserted following the transgene sequences and before the 3' AAV ITR sequence. A rAAV construct useful in the disclosure may also contain an intron, desirably located between the promoter/enhancer sequence and the transgene. One possible intron sequence is derived from SV-40, and is referred to as the SV-40 T intron sequence. Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional and many such sequences are available [see, e.g., Sambrook et al., and references cited therein at, for example, pages 3.18 3.26 and 16.17 16.27 and Ausubel et al., Current Protocols in Molecular Biology, John Wiley & Sons, New York, 1989]. In some embodiments, a Foot and Mouth Disease Virus 2A sequence is included in polyprotein; this is a small peptide (approximately 18 amino acids in length) that has been shown to mediate the cleavage of polyproteins (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459). The cleavage activity of the 2A sequence has previously been demonstrated in artificial systems including plasmids and gene therapy vectors (AAV and retroviruses) (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459; de Felipe, P et al., Gene Therapy, 1999; 6: 198-208; de Felipe, P et al., Human Gene Therapy, 2000; 11: 1921-1931; and Klump, H et al., Gene Therapy, 2001; 8: 811-817).

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1a promoter [Invitrogen]. In some embodiments, a promoter is an RNA pol II promoter. In some embodiments, a promoter is an RNA pol III promoter, such as U6 or H1. In some embodiments, a promoter is an RNA pol II promoter. In some embodiments, a promoter is a chicken β-actin (CBA) promoter. In some embodiments, a promoter comprises a U1a promoter.

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene (e.g., FOXG1) will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters: retinoschisin proximal promoter, interphotoreceptor retinoid-binding protein enhancer (RS/IRBPa), rhodopsin kinase (RK), liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a α-myosin heavy chain (α-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

In some embodiments, the promoter preferentially drives transgene expression in certain tissues. In some embodiments, the disclosure provides a nucleic acid comprising a tissue-specific promoter operably linked to a transgene. As used herein, "tissue-specific promoter" refers to a promoter that preferentially regulates (e.g., drives or up-regulates) gene expression in a particular cell type relative to other cell types. A cell-type-specific promoter can be specific for any cell type, such as central nervous system (CNS) cells, liver cells (e.g., hepatocytes), heart cells, muscle cells, etc. In some embodiments, a tissue-specific promoter is a muscle tissue or cell-specific promoter. Examples of CNS-specific promoters include but are not limited to synapsin (Syn), GFAP, Ca $2^+$/calmodulin-dependent protein kinase II (hCAMKII), etc.

In some aspects, the disclosure relates to isolated nucleic acids comprising a transgene encoding one or more miRNA binding sites. Without wishing to be bound by any particular theory, incorporation of miRNA binding sites into gene expression constructs allows for regulation of transgene expression (e.g., inhibition of transgene expression) in cells and tissues where the corresponding miRNA is expressed. In some embodiments, incorporation of one or more miRNA binding sites into a transgene allows for de-targeting of transgene expression in a cell-type specific manner. In some embodiments, one or more miRNA binding sites are positioned in a 3' untranslated region (3' UTR) of a transgene, for example between the last codon of a nucleic acid sequence encoding one or more complement control proteins as described herein, and a poly A sequence.

In some embodiments, a transgene comprises one or more (e.g., 1, 2, 3, 4, 5, or more) miRNA binding sites that de-target expression of a transgene from liver cells. For example, in some embodiments, a transgene comprises one or more miR-122 binding sites.

In some embodiments, a transgene comprises one or more (e.g., 1, 2, 3, 4, 5, or more) miRNA binding sites that de-target expression of a transgene from immune cells (e.g., antigen presenting cells (APCs), such as macrophages, dendrites, etc.). Incorporation of miRNA binding sites for immune-associated miRNAs may de-target transgene (e.g., one or more inhibitory nucleic acids) expression from antigen presenting cells and thus reduce or eliminate immune responses (cellular and/or humoral) produced in the subject against products of the transgene, for example as described in US 2018/0066279, the entire contents of which are incorporated herein by reference.

As used herein an "immune-associated miRNA" is an miRNA preferentially expressed in a cell of the immune system, such as an antigen presenting cell (APC). In some embodiments, an immune-associated miRNA is an miRNA expressed in immune cells that exhibits at least a 2-fold, 3-fold, 4-fold, 5-fold, 6-fold, 7-fold, 8-fold, 9-fold, 10-fold higher level of expression in an immune cell compared with a non-immune cell (e.g., a control cell, such as a HeLa cell, HEK293 cell, mesenchymal cell, etc.). In some embodiments, the cell of the immune system (immune cell) in which the immune-associated miRNA is expressed is a B cell, T cell, Killer T cell, Helper T cell, γδ T cell, dendritic cell, macrophage, monocyte, vascular endothelial cell, or other immune cell. In some embodiments, the cell of the immune system is a B cell expressing one or more of the following markers: B220, BLAST-2 (EBVCS), Bu-1, CD19, CD20 (L26), CD22, CD24, CD27, CD57, CD72, CD79a, CD79b, CD86, chB6, D8/17, FMC7, L26, M17, MUM-1, Pax-5 (BSAP), and PC47H. In some embodiments, the cell of the immune system is a T cell expressing one or more of the following markers: ART2, CD1a, CD1d, CD11b (Mac-1), CD134 (OX40), CD150, CD2, CD25 (interleukin 2 receptor alpha), CD3, CD38, CD4, CD45RO, CD5, CD7, CD72, CD8, CRTAM, FOXP3, FT2, GPCA, HLA-DR, HML-1, HT23A, Leu-22, Ly-2, Ly-m22, MICG, MRC OX 8, MRC OX-22, OX40, PD-1 (Programmed death-1), RT6, TCR (T cell receptor), Thy-1 (CD90), and TSA-2 (Thymic shared Ag-2). In some embodiments, the immune-associated miRNA is selected from: miR-15a, miR-16-1, miR-17, miR-18a, miR-19a, miR-19b-1, miR-20a, miR-21, miR-29a/b/c, miR-30b, miR-31, miR-34a, miR-92a-1, miR-106a, miR-125a/b, miR-142-3p, miR-146a, miR-150, miR-155, miR-181a, miR-223 and miR-424, miR-221, miR-222, let-7i, miR-148, and miR-152. In some embodiments, a transgene described herein comprises one or more binding sites for miR-142.

Recombinant Adeno-Associated Viruses (rAAVs)

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a transgene of the rAAV will be delivered specifically to one or more predetermined tissue(s) (e.g., muscle tissues, ocular tissues, neurons, etc.). The AAV capsid is an important element in determining these tissue-specific targeting capabilities (e.g., tissue tropism). Thus, an rAAV having a capsid appropriate for the tissue being targeted can be selected.

In some embodiments, rAAVs of the disclosure comprise a nucleotide sequence as set forth in SEQ ID NO: 2 or 3, or encode a protein having an amino acid sequence as set forth in SEQ ID NO: 1. In some embodiments, rAAVs of the disclosure comprise a nucleotide sequence that is 99% identical, 95% identical, 90% identical, 85% identical, 80% identical, 75% identical, 70% identical, 65% identical, 60% identical, 55% identical, or 50% identical to a nucleotide sequence as set forth in SEQ ID NO: 2, 3, 8, 9, 10, 11, 12, or 13.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein has a tropism for central nervous system (CNS) tissues. In some embodiments, an AAV capsid protein targets neuronal cell types, astrocytes, oligodendrocytes, glial cells, etc. In some embodiments, an AAV capsid protein is of an AAV serotype selected from the group consisting of AAV1, AAV2, AAV3, AAV4, AAV5, AAV6, AAV7, AAV8, AAVrh8, AAV9, AAV10, AAVrh10, AAV·PHP-eB, AAVrh39, AAVrh43, and variants of any of the foregoing.

In some embodiments, an rAAV vector or rAAV particle comprises a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ΔTRS ITR). Without wishing to be bound by any particular theory, a rAAV vector comprising an ITR lacking a functional TRS produces a self-complementary rAAV vector, for example as described by McCarthy (2008) *Molecular Therapy* 16(10):1648-1656.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a coding sequence encoding a transgene (e.g., FOXG1). A "host cell" refers to any cell that harbors, or is capable of harboring, a substance of interest. Often a host cell is a mammalian cell. In some embodiments, a host cell is a neuron. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation. In some embodiments, the host cell is a mammalian cell, a yeast cell, a bacterial cell, an insect cell, a plant cell, or a fungal cell. In some embodiments, the host cell is a neuron or a glial cell.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an AAV vector (comprising a transgene flanked by ITR elements) to be packaged into AAV particles, an AAV helper function vector, and an accessory function vector. An AAV helper function vector encodes the "AAV helper function" sequences (e.g., rep and cap), which function in trans for productive AAV replication and encapsidation. Preferably, the AAV helper function vector supports efficient AAV vector production without generating any detectable wild-type AAV virions (e.g., AAV virions containing functional rep and cap genes). Non-limiting examples of vectors suitable for use with the disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (e.g., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpes virus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. In some embodiments, a vector is a viral vector, such as an rAAV vector, a lentiviral vector, an adenoviral vector, a retroviral vector, etc. Thus, the term includes cloning and expression vehicles, as well as viral vectors. In some embodiments, useful vectors are contemplated to be those vectors in which the nucleic acid segment to be transcribed is positioned under the transcriptional control of a promoter.

AAV-Mediated Delivery of a Transgene to Tissue

The isolated nucleic acids, rAAVs, and compositions of the disclosure may be delivered to a subject in compositions according to any appropriate methods known in the art. For example, an rAAV, preferably suspended in a physiologically compatible carrier (e.g., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human. In some embodiments, a subject is human.

Delivery of the rAAVs may be by, for example intramuscular injection or infusion into the muscle tissue or cells of a subject. As used herein, "muscle tissues" refers to any tissue derived from or contained in skeletal muscle, smooth muscle, or cardiac muscle of a subject. Non-limiting examples of muscle tissues include skeletal muscle, smooth muscle, cardiac muscle, myocytes, sarcomeres, myofibrils, etc.

Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue.

Aspects of the instant disclosure relate to compositions comprising a recombinant AAV comprising a capsid protein and a nucleic acid encoding a transgene, wherein the transgene comprises a nucleic acid sequence encoding a Forkhead box G1 (FOXG1) protein. In some embodiments, the nucleic acid further comprises AAV ITRs. In some embodiments, a composition further comprises a pharmaceutically acceptable carrier.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, parachlorophenol, and poloxamers (non-ionic surfactants) such as Pluronic® F-68. Suitable chemical stabilizers include gelatin and albumin.

The rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., intraportal delivery to the liver), intraocular injection, subretinal injection, oral, inhalation (including intranasal and intratracheal delivery), intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art.

An effective amount of an rAAV is an amount sufficient to target infect an animal, target a desired tissue. In some embodiments, an effective amount of an rAAV is administered to the subject during a pre-symptomatic stage of degenerative disease. In some embodiments, a subject is administered an rAAV or composition after exhibiting one or more signs or symptoms of degenerative disease.

An effective amount of an rAAV may also depend on the mode of administration. For example, targeting a muscle tissue (e.g., muscle cells) by intramuscular administration or subcutaneous injection may require different (e.g., higher or lower) doses, in some cases, than targeting muscle tissue by another method (e.g., systemic administration, topical administration, etc.). In some embodiments, intramuscular injection (IM) of rAAV having certain serotypes (e.g., AAV2, AAV6, etc.) mediates efficient transduction of muscle cells. Thus, in some embodiments, the injection is intramuscular injection (IM). In some embodiments, the injection is systemic administration (e.g., intravenous injection). In some cases, multiple doses of a rAAV are administered.

In some embodiments, rAAV compositions are formulated to reduce aggregation of AAV particles in the composition, particularly where high rAAV concentrations are present (e.g., ~$10^{13}$ GC/mL or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either intraocularly, subretinally, subcutaneously, intraopancreatically, intranasally, parenterally, intravenously, intramuscularly, intrathecally, orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 mL of isotonic NaCl solution and either added to 1000 mL of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 µm) should be designed using polymers able to be degraded in vivo. Biodegradable polyalkyl-cyanoacrylate nanoparticles that meet these requirements are contemplated for use.

In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S.

Pat. Nos. 5,770,219 and 5,783,208) and feedback-controlled delivery (U.S. Pat. No. 5,697,899).

Therapeutic Methods

Aspects of the disclosure relate to compositions and methods for treating certain neurological diseases, for example FOXG1 syndrome. The disclosure is based, in part, on isolated nucleic acids, rAAVs, etc., which encode a FOXG1 protein. In some embodiments, increasing FOXG1 protein expression results in improved brain or neuronal cell development in a subject (e.g., relative to a subject that has reduced FOXG1 expression or does express functional FOXG1 protein).

In some embodiments, a subject is a mammalian subject, for example a human subject. In some embodiments, a subject is characterized as having one or more mutations in a FOXG1 gene, for example one or more mutations resulting in reduced (or absence) of functional FOXG1 protein in the cells of the subject. Examples of FOXG1 mutations are described, for example by Vegas et al. (2018) *Neurol Genet*, 4(6) e281. In some embodiments, a subject has reduced (or no) functional FOXG1 protein in their cells.

In some embodiments, administering the isolated nucleic acids, the rAAVs, or the compositions described herein to a cell or subject increases FOXG1 expression in the cell or subject by between 2-fold and 100-fold (e.g., 2-fold, 5-fold, 10-fold, 20-fold, 50-fold, 75-fold, 100-fold, etc.) compared to a control subject. As used herein a "control" subject refers to a subject that is not administered the isolated nucleic acids, the rAAVs, or the compositions described herein. In some embodiments, a control subject is the same subject that is administered the isolated nucleic acids, the rAAVs, or the compositions described herein (e.g., prior to the administration).

In some aspects, the disclosure relates to a method for treating FOXG1 syndrome in a subject, the method comprising: administering to the subject an isolated nucleic acid, rAAV, or pharmaceutical composition as described herein.

As used herein, the term "treating" refers to the application or administration of a composition comprising a transgene encoding a FOXG1 protein to a subject, who has a symptom or a disease associated with aberrant FOXG1 activity, or a predisposition toward a disease associated with aberrant FOXG1 activity, with the purpose to cure, heal, alleviate, relieve, alter, remedy, ameliorate, improve, or affect the disorder, the symptom of the disease, or the predisposition toward a disease associated with aberrant FOXG1 activity.

Alleviating a disease associated with aberrant FOXG1 activity includes delaying the development or progression of the disease, or reducing disease severity. Alleviating the disease does not necessarily require curative results. As used therein, "delaying" the development of a disease (such as a disease associated with aberrant FOXG1 activity) means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a disease associated with aberrant FOXG1 activity or angiogenesis includes initial onset and/or recurrence.

Compositions described herein may be administered (or a transgene expressed) in one or more target cells of a subject (e.g., a mammalian subject, such as a human). In some embodiments, a composition (e.g., isolated nucleic acid, rAAV, etc.) is administered to a cell of the central nervous system (CNS) of a subject. Examples of CNS cells include but are not limited to neurons, astrocytes, glial cells, etc. In some embodiments, a CNS cells is a telencephalon cell. Examples of telencephalon cells include but are not limited to glutamatergic projection neurons, GABA (γ-aminobutyric acid)-ergic interneurons and projection neurons, and cholinergic interneurons and projection neurons.

Kits and Related Compositions

The agents described herein may, in some embodiments, be assembled into pharmaceutical or diagnostic or research kits to facilitate their use in therapeutic, diagnostic or research applications. A kit may include one or more containers housing the components of the disclosure and instructions for use. Specifically, such kits may include one or more agents described herein, along with instructions describing the intended application and the proper use of these agents. In certain embodiments agents in a kit may be in a pharmaceutical formulation and dosage suitable for a particular application and for a method of administration of the agents. Kits for research purposes may contain the components in appropriate concentrations or quantities for running various experiments.

The kit may be designed to facilitate use of the methods described herein by researchers and can take many forms. Each of the compositions of the kit, where applicable, may be provided in liquid form (e.g., in solution), or in solid form, (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. As used herein, "instructions" can define a component of instruction and/or promotion, and typically involve written instructions on or associated with packaging of the disclosure. Instructions also can include any oral or electronic instructions provided in any manner such that a user will clearly recognize that the instructions are to be associated with the kit, for example, audiovisual (e.g., videotape, DVD, etc.), Internet, and/or web-based communications, etc. The written instructions may be in a form prescribed by a governmental agency regulating the manufacture, use or sale of pharmaceuticals or biological products, which instructions can also reflect approval by the agency of manufacture, use or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The agents may be in the form of a liquid, gel or solid (powder). The agents may be prepared sterilely, packaged in syringe and shipped refrigerated. Alternatively it may be housed in a vial or other container for storage. A second container may have other agents prepared sterilely. Alternatively the kit may include the active agents premixed and shipped in a syringe, vial, tube, or other container. The kit may have one or more or all of the components required to administer the agents to an animal, such as a syringe, topical application devices, or intravenous needle tubing and bag, particularly in the case of the kits for producing specific somatic animal models.

The kit may have a variety of forms, such as a blister pouch, a shrink wrapped pouch, a vacuum sealable pouch, a sealable thermoformed tray, or a similar pouch or tray form, with the accessories loosely packed within the pouch, one or more tubes, containers, a box or a bag. The kit may be sterilized after the accessories are added, thereby allowing the individual accessories in the container to be otherwise unwrapped. The kits can be sterilized using any appropriate sterilization techniques, such as radiation sterilization, heat sterilization, or other sterilization methods known in the art. The kit may also include other components, depending on the specific application, for example, containers, cell media, salts, buffers, reagents, syringes, needles, a fabric, such as gauze, for applying or removing a disinfecting agent, disposable gloves, a support for the agents prior to administration etc.

The instructions included within the kit may involve methods for constructing an AAV vector as described herein. In addition, kits of the disclosure may include, instructions, a negative and/or positive control, containers, diluents and buffers for the sample, sample preparation tubes and a printed or electronic table of reference AAV sequence for sequence comparisons.

EXAMPLE

This example describes rAAV-mediated gene replacement therapies for FOXG1 syndrome. FOXG1 expression is enriched in the brain, especially in the telencephalon. In a commercially available mouse line, the endogenous Foxg1 coding sequence was replaced with the Cre gene. Heterozygotes (Foxg1$^{+/Cre}$) not only have a Cre expression pattern reflecting that of FOXG1, but also recapitulate aspects of human FOXG1 syndrome. Recombinant AAV (rAAV) vectors that carry a Cre-inducible EGFP reporter gene (iEGFP) (FIG. 1A) were produced. Two reporter plasmid designs for single-stranded and self-complementary AAV (scAAV) vector packaging in HEK293 cells were validated (FIG. 1B). Following delivery of rAAV vector to Foxg1$^{+/Cre}$ mice, EGFP expression was indicative of gene delivery to the cells that normally express FOXG1, serving as a convenient and accurate readout for target engagement at cellular resolution.

To target the broad telencephalon, systemic delivery by intravenous (IV) injection of rAAV particles, for example AAV9 and AAV·PHP-eB particles is performed. AAV9 viral particles have been observed to cross the blood-brain-barrier (BBB) by IV delivery, and have been approved by FDA as a gene therapy for spinal muscular atrophy. AAV·PHP-eB vector is, in some embodiments, 50× more efficient than AAV9 in crossing BBB in certain mouse strains such as the Foxg1$^{+/Cre}$ mice. The rAAV-iEGFP vectors can be injected into Foxg1$^{+/Cre}$ mice at different ages, namely postnatal day 1 (P1) representing newborns, or 4-week-old mice equivalent to juveniles. Four weeks after injection, mice are euthanized, and EGFP expression in the brain is be assessed by immunofluorescence microscopy of tissue sections.

Figure 2B:
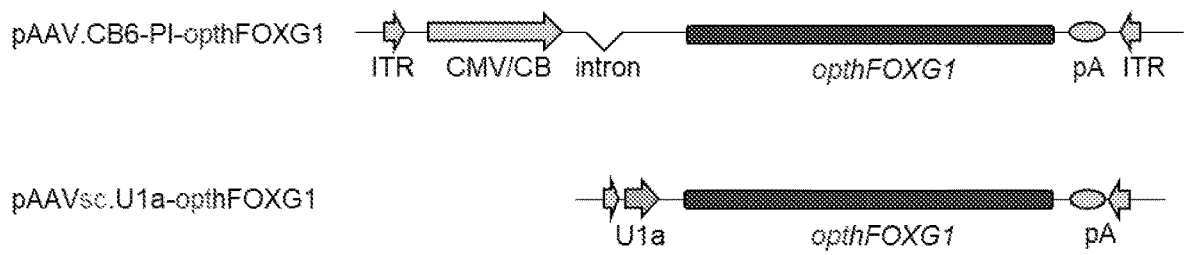
Figure 2C:
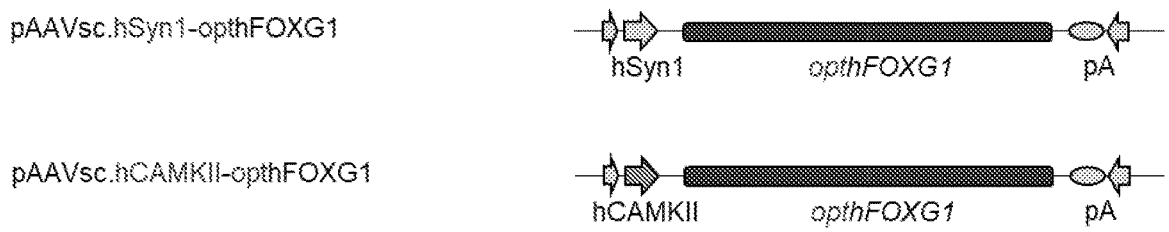

Besides delivering to the right target tissues and cell types, it is also important to achieve physiological level of FOXG1 expression, because overexpression is associated with adverse phenotype in mice. FOXG1 expression is titrated to wild-type (WT) level by a combination of variables including promoter choice, codon optimization of the transgene sequence, and Kozak sequence upstream of the start codon. A series of FOXG1 expression cassettes was designed to allow for a gradient of expression strength (FIGS. 2A-2C). Two of the vectors comprise neuron-specific promoters in order to achieve neuron-specific transduction and expression of FOXG1.

Figure 3:
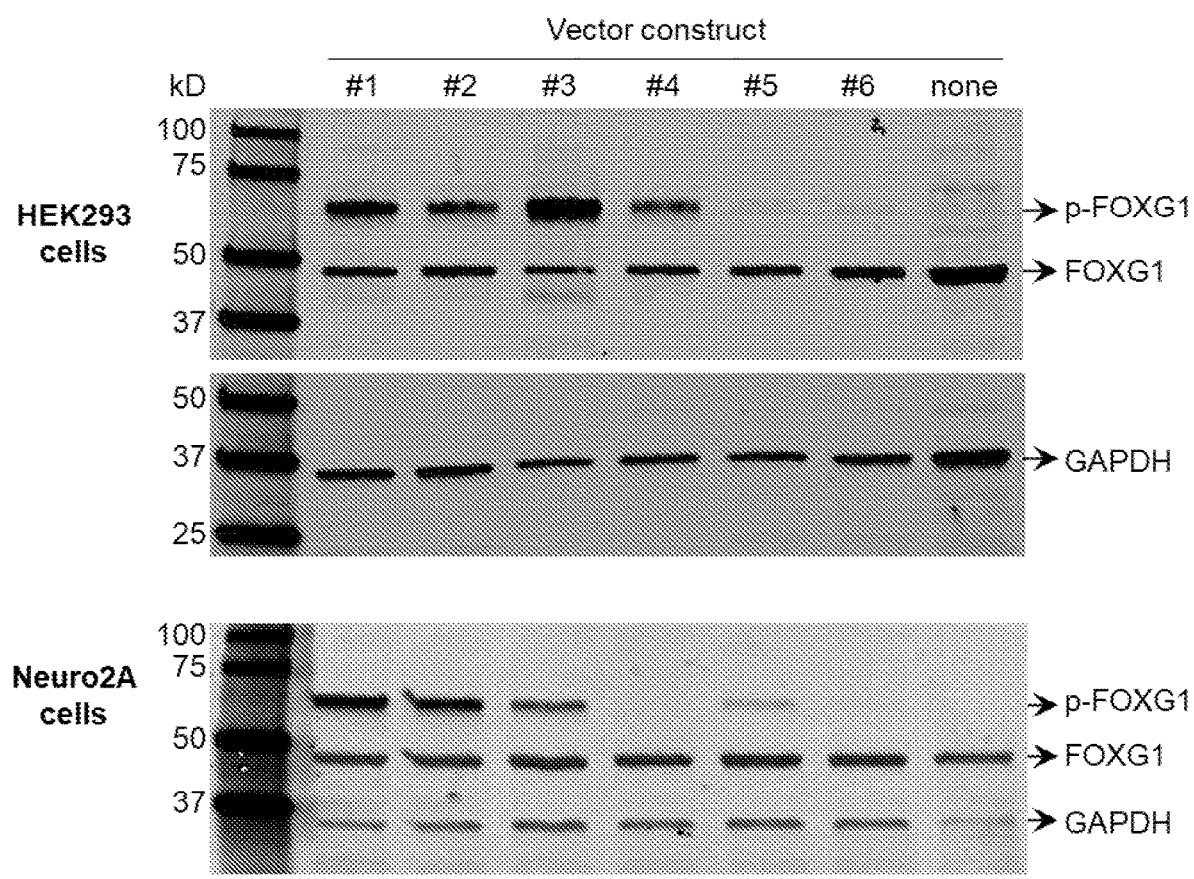
FIG. 3 shows representative data indicating FOXG1 is expressed from plasmid AAV constructs in HEK293 cells and Neuro2A cells.

A series of in vitro and in vivo experiments were performed. The six constructs described in Table 1 were tested for FOXG1 expression in HEK293 cells and Neuro2A cells (FIG. 3). Data indicate FOXG1 is expressed from the plasmid rAAV constructs in both cell types.

Figures 4A, 4B, 4C, 4D, 4E:
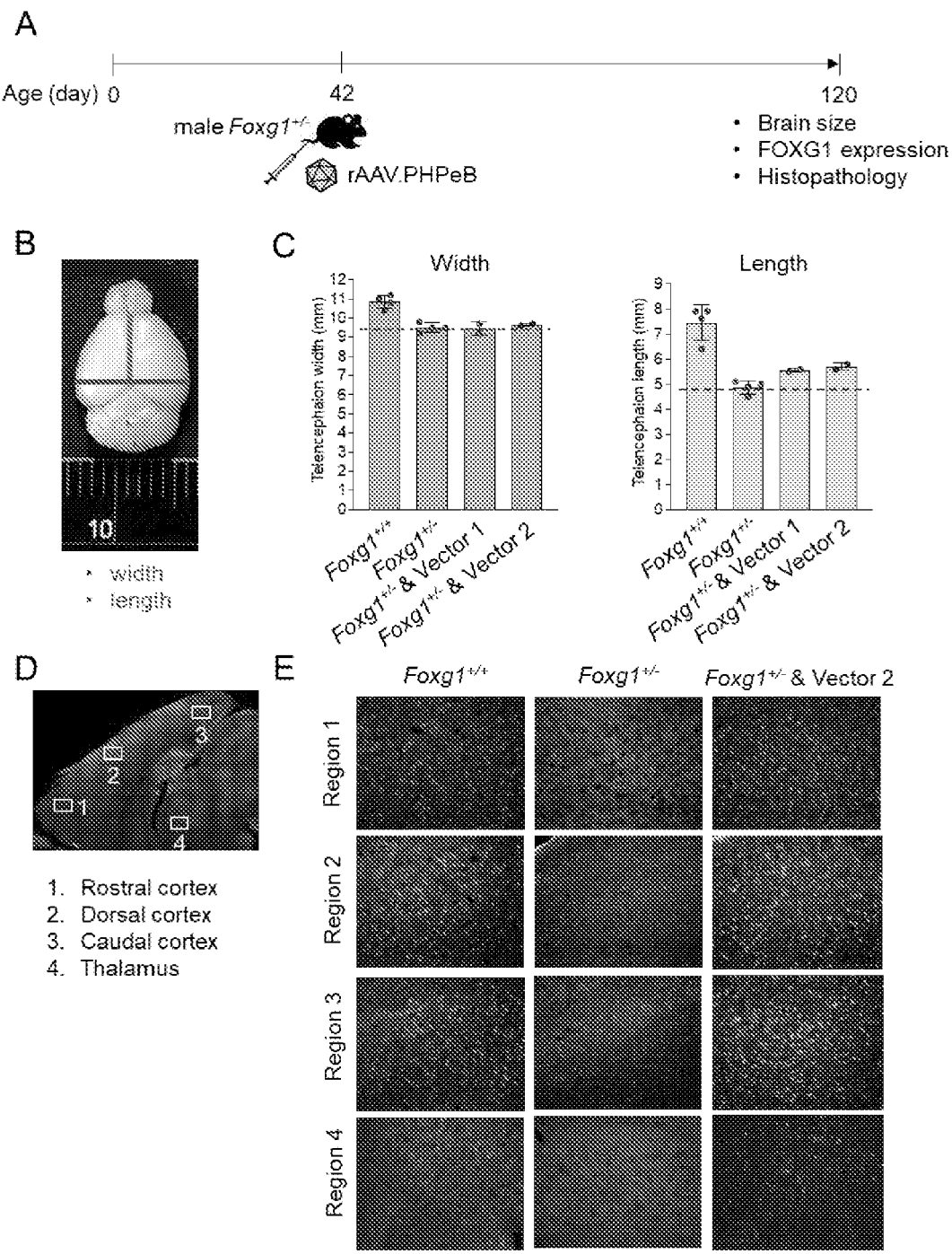
FIGS. 4A-4E show representative data for treatment of Foxg1+/− adult mice with rAAV led to partial correction of brain shape and restoration of FOXG1 expression in the brain.
Figure 5A:
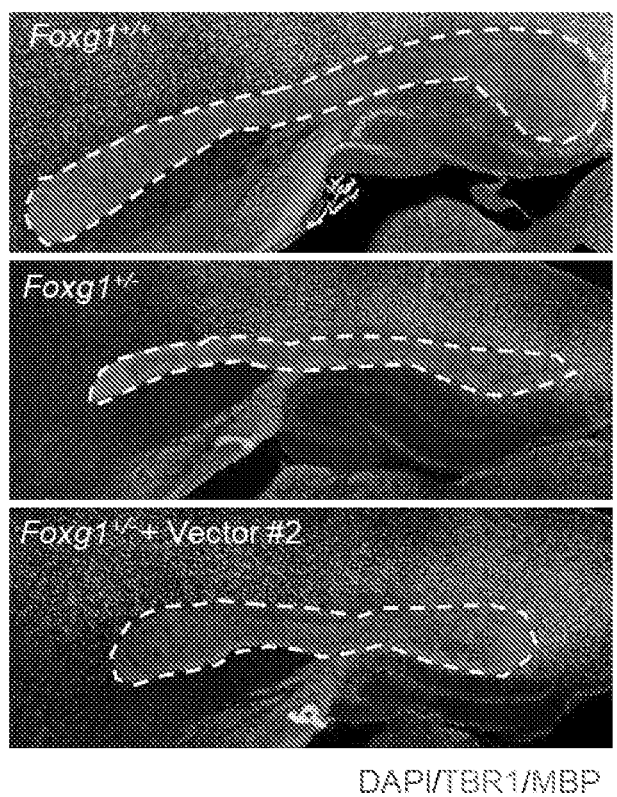
FIGS. 5A-5B show representative immunofluorescence data.
Figure 5B:
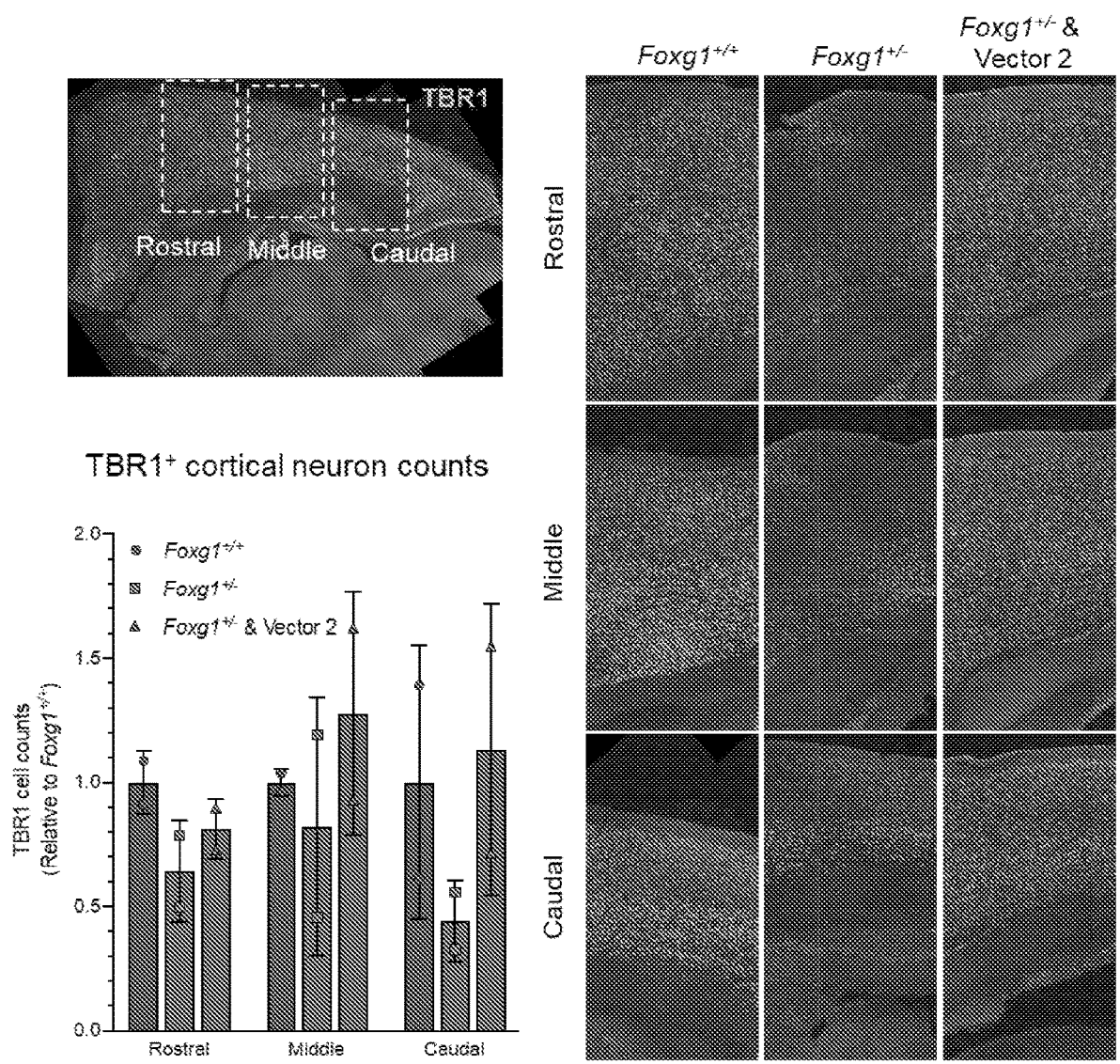

Next, in vivo experiments were conducted in adult Foxg1$^{+/Cre}$ mice. Briefly, all constructs were packaged individually into PHP·eB capsid. Adult (42-day old) Foxg1$^{+/-}$ mice were treated by tail vein injection of 1E+12 genome copies (GC), and tissues were harvested for analysis at 120 days old (FIG. 4A). The brain size of Foxg1$^{+/-}$ mice was drastically reduced compared to Foxg1$^{+/+}$ mice, consistent with microcephaly found in patients. Treatment with either vector #1 or vector #2 partially corrected brain length; brain width remained unchanged (FIGS. 4B-4C). Immunofluorescence staining of FOXG1 revealed reduced FOXG1 expression in the Foxg1$^{+/-}$ mice, and treatment with vector #2 restored FOXG1 expression (FIGS. 4D-4E). Additionally, immunofluorescence staining of myelin binding protein (MBP) revealed reduced corpus callosum (CC) size in the Foxg1$^{+/-}$ mice, and treatment with vector #2 partially restored CC size (FIG. 5A). FIG. 5B shows representative data for immunofluorescence staining of TBR1 (a cortical neuronal marker) revealed reduced cortical neuron numbers in the Foxg1$^{+/-}$ mice, and treatment with vector #2 partially restored the cortical neuron counts.

A series of behavioral assessments, including rotarod for motor function, three-chamber sociability testing for autistic-like social behavior, and T-maze for learning and memory, were also performed.

TABLE 1 rAAV vectors tested in adult mice.

| Vector ID | Vector Name |
| --- | --- |
| #1 | pAAV.CB6-Pl-hFOXG1 |
| #2 | pAAV.CB6-Pl-opthFOXG1 |
| #3 | pAAVsc.U1a-hFOXG1 |
| #4 | pAAVsc.U1a-opthFOXG1 |
| #5 | pAAVsc.hSyn1-opthFOXG1 |
| #6 | pAAVsc.hCAMKII-opthFOXG1 |

Figure 6A:
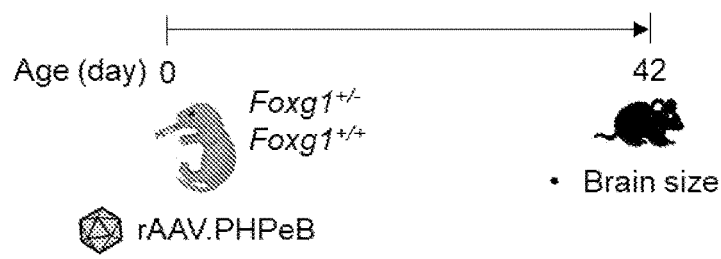
FIGS. 6A-6B show representative data for treatment of Foxg1$^{+/-}$ neonatal mice with rAAV.
Figure 6B:
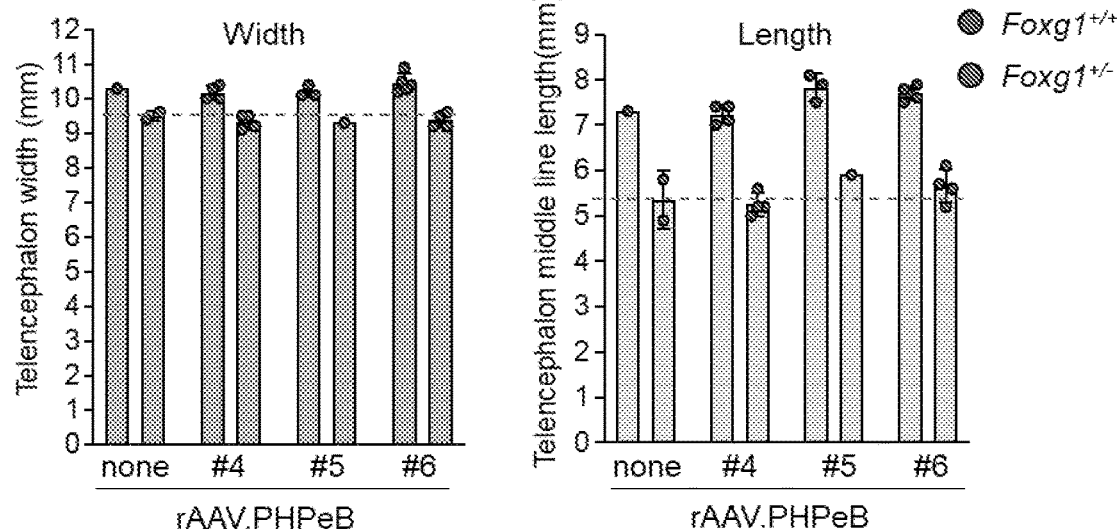

Next, in vivo experiments were conducted in neonatal mice (FIG. 6A). Briefly, neonates were treated with rAAV·PHPeB vectors at 4E+11 GC/pup via facial vein injection (Table 2). Administration of vectors #1, #2, and #3 led to animal death. The other vectors were well tolerated (FIG. 6B). Tissues were harvested from the surviving animals at 42-days old. No change in brain size was observed under this experimental condition (FIG. 6B).

TABLE 2 rAAV vectors tested in neonatal mice.

| Vector ID | Vector Name | Outcome |
|---|---|---|
| #1 | pAAV.CB6-Pl-hFOXG1 | Death <1 week |
| #2 | pAAV.CB6-Pl-opthFOXG1 | Death <1 week |
| #3 | pAAVsc.U1a-hFOXG1 | Death <3 weeks |
| #4 | pAAVsc.U1a-opthFOXG1 | Alive |
| #5 | pAAVsc.hSyn1-opthFOXG1 | Alive |
| #6 | pAAVsc.hCAMKII-opthFOXG1 | Alive |

SEQUENCES

\>Forkhead box G1 protein (FOXG1) amino acid sequence;
NCBI NP_005240.3

(SEQ ID NO: 1)

MLDMGDRKEVKMIPKSSFSINSLVPEAVQNDNHHASHGHHNSHHPQHHHHHHHHHHPPPPAP

QPPPPPQQQQPPPPPPPAPQPPPQTRGAPAADDDKGPQQLLLPPPPPPPPAAALDGAKADGLGG

KGEPGGGPGELAPVGPDEKEKGAGAGGEEKKGAGEGGKDGEGGKEGEKKNGKYEKPPFSYNAL

IMMAIRQSPEKRLTLNGIYEFIMKNFPYYRENKQGWQNSIRHNLSLNKCFVKVPRHYDDPGKG

NYWMLDPSSDDVFIGGTTGKLRRRSTTSRAKLAFKRGARLTSTGLTFMDRAGSLYWPMSPFLS

LHHPRASSTLSYNGTTSAYPSHPMPYSSVLTQNSLGNNHSFSTANGLSVDRLVNGEIPYATHH

LTAAALAASVPCGLSVPCSGTYSLNPCSVNLLAGQTSYFFPHVPHPSMTSQSSTSMSARAASS

STSPQAPSTLPCESLRPSLPSFTTGLSGGLSDYFTHQNQGSSSNPLIH

\>FOXG1 nucleic acid sequence; NCBI NM_005249.5

(SEQ ID NO: 2)

AATTGTGGCTATAGCCGCCTCGATCGCTGTCTCCCCAGCCTCGCCGCGGCCGCTCCGGGACGC

GCCCGCCCGCCGCCCGGCTCTCCCCCCCTTTGGGCTGCTGCTGCTGCTGCTGTGACTGCTGCT

GCGAGAGGAGGAGGAGGAGGAGGAAGCAGCGGGGGGGGGAGCGGGGGGTGGGGGGGGAGACCA

AGAAGTACAGTTGGGAGCGAGGGAGCTTCACCCCCGGGGCGGTGGTTGTTTCTTTTTTCTTTC

TTTCTTTTTTCTTTTCCTTTTTTTTTTTTTTTCTAATTCCTGAGGGGTGGTTGCTGCTTTTGC

TACATGACTTGCCAGCGCCCGAGCCTGCGGTCCAACTGCGCTGCTGCCGGAGCGCTCAGTGCC

GCCGCTGCCGCCCGCGCCCCCGCGCCCCGTTCGGCACCCACCGGTCGCCGCCGCCCGCCGCG

CCGCTGTCCCGCTCCCGCGCCGCCGCCGCCGTTTCCCCCCGACGACTGGGTGATGCTGGACAT

GGGAGATAGGAAAGAGGTGAAAATGATCCCCAAGTCCTCGTTCAGCATCAACAGCCTGGTGCC

CGAGGCGGTCCAGAACGACAACCACCACGCGAGCCACGGCCACCACAACAGCCACCACCCCCA

GCACCACCACCACCACCACCACCATCACCACCACCCGCCGCCGCCCGCCCCGCAACCGCCGCC

GCCGCCGCAGCAGCAGCAGCCGCCGCCGCCGCCGCCCCCGGCACCGCAGCCCCCCAGACGCG

GGGCGCCCCGGCCGCCGACGACGACAAGGGCCCCCAGCAGCTGCTGCTCCCGCCGCCGCCACC

GCCACCACCGGCCGCCGCCCTGGACGGGGCTAAAGCGGACGGGCTGGGCGGCAAGGGCGAGCC

GGGCGGCGGGCCGGGGGAGCTGGCGCCCGTCGGGCCGGACGAGAAGGAGAAGGGCGCCGGCGC

CGGGGGGGAGGAGAAGAAGGGGGCGGGCGAGGGCGGCAAGGACGGGGAGGGGGGCAAGGAGGG

CGAGAAGAAGAACGGCAAGTACGAGAAGCCGCCGTTCAGCTACAACGCGCTCATCATGATGGC

CATCCGGCAGAGCCCCGAGAAGCGGCTCACGCTCAACGGCATCTACGAGTTCATCATGAAGAA

CTTCCCTTACTACCGCGAGAACAAGCAGGGCTGGCAGAACTCCATCCGCCACAATCTGTCCCT

CAACAAGTGCTTCGTGAAGGTGCCGCGCCACTACGACGACCCGGGCAAGGGCAACTACTGGAT

GCTGGACCCGTCGAGCGACGACGTGTTCATCGGCGGCACCACGGGCAAGCTGCGGCGCCGCTC

CACCACCTCGCGGGCCAAGCTGGCCTTCAAGCGCGGTGCGCGCCTCACCTCCACCGGCCTCAC

CTTCATGGACCGCGCCGGCTCCCTCTACTGGCCCATGTCGCCCTTCCTGTCCCTGCACCACCC

| SEQUENCES |
| --- |
| CCGCGCCAGCAGCACTTTGAGTTACAACGGCACCACGTCGGCCTACCCCAGCCACCCCATGCC |
| CTACAGCTCCGTGTTGACTCAGAACTCGCTGGGCAACAACCACTCCTTCTCCACCGCCAACGG |
| CCTGAGCGTGGACCGGCTGGTCAACGGGGAGATCCCGTACGCCACGCACCACCTCACGGCCGC |
| CGCGCTAGCCGCCTCGGTGCCCTGCGGCCTGTCGGTGCCCTGCTCTGGGACCTACTCCCTCAA |
| CCCCTGCTCCGTCAACCTGCTCGCGGGCCAGACCAGTTACTTTTTCCCCCACGTCCCGCACCC |
| GTCAATGACTTCGCAGAGCAGCACGTCCATGAGCGCCAGGGCCGCGTCCTCCTCCACGTCGCC |
| GCAGGCCCCCTCGACCCTGCCCTGTGAGTCTTTAAGACCCTCTTTGCCAAGTTTTACGACGGG |
| ACTGTCTGGGGACTGTCTGATTATTTCACACATCAAAATCAGGGGTCTTCTTCCAACCCTTT |
| AATACATTAACATCCCTGGGACCAGACTGTAAGTGAACGTTTTACACACATTTGCATTGTAAA |
| TGATAATTAAAAAAATAAGTCCAGGTATTTTTATTAAGCCCCCCCTCCCATTTCTGTACGT |
| TTGTTCAGTCTCTAGGGTTGTTTATTATTCTAACAAGGTGTGGAGTGTCAGCGAGGTGCAATG |
| TGGGGAGAATACATTGTAGAATATAAGGTTTGGAAGTCAAATTATAGTAGAATGTGTATCTAA |
| ATAGTGACTGCTTTGCCATTTCATTCAAACCTGACAAGTCTATCTCTAAGAGCCGCCAGATTT |
| CCATGTGTGCAGTATTATAAGTTATCATGGAACTATATGGTGGACGCAGACCTTGAGAACAAC |
| CTAAATTATGGGAGAATTTTAAAATGTTAAACTGTAATTTGTATTTAAAAAGCATTCGTAGT |
| AAAGGTGCCCAAGAAATTATTTTGGCCATTTATTGTTTGTCCTTTTCTTTAAAGAACTGTTT |
| TTTTTTCTTTTGTTTACTTTTAGACCAAAGATTGGGTTCTAGAAAATGCACTTGGTATACTAA |
| GTATTAAAACAAACAAAAGGAAAGTTGTTTCAGTTGGCAACACTGCCCATTCAATTGAATCA |
| GAAGGGGACAAAATTAACGATTGCCTTCAGTTTGTGTTGTGTATATTTTGATGTATGTGGTCA |
| CTAACAGGTCACTTTTATTTTTTCTAAATGTAGTGAAATGTTAATACCTATTGTACTTATAGG |
| TAAACCTTGCAAATATGTAACCTGTGTTGCGCAAATGCCGCATAAATTTGAGTGATTGTTAAT |
| GTTGTCTTAAAATTTCTTGATTGTGATACTGTGGTCATATGCCCGTGTTTGTCACTTACAAAA |
| ATGTTTACTATGAACACACAGAAATAAAAAATAGGCTAAATTCATATATATCTTGATACTTTT |
| GTCTCTTTTATTAAGTAGAGCTAATTTTTTAAAGACCAATCAACTTATAGGGAATTCAAAGGC |
| TTTTTCAGCCAAACTAAAATTTAAACTGCTCCTTTAATTTGAACTGACTCTAAAAATGAAAAT |
| AGTATTTTTCCCTTTGTGAACAAATTTTACAAGGAGCAGCCTATTTAATAAACACTAGCTTTA |
| AACAAAGTATAGGCTTTTCAGCTGATACCTGTAAGTTTCTGTGGATATACAGCAAAAAGAGAT |
| ATAATTTAATTTTCTGTGCATAGCTCTTTACCCTGTGTTTATTTCCAAATCCATTAATAGAAT |
| GCCATTTATATATTTTGTTTCAGGTATATTGTTAATAGAGCTTGGCAAATTATAAATAAATAT |
| ATGTATATGGTTAGATAGAAGTGACTATAATGCACACATATGTAATATATATAGACACACAGA |
| GCCCTTCAGTTCAGGTACAATTTGCGCTATGAATGCTGCAAACATTTTTGTTTAAATATTTGT |
| ATTTATACTTTCTAAGTCAGCATTTATTTTTGTGGCTGTTTACCCACAATGAAAGAGTTCTAA |
| TAAAGATGTGCTGAAGTTGCAATATA |

>Codon optimized FOXG1 nucleic acid sequence (SEQ ID NO: 3)

ATGCTGGACATGGGCGATAGGAAGGAAGTCAAGATGATCCCCAAGAGTAGTTTCTCAATCAAT

AGCCTGGTGCCCGAAGCCGTGCAGAACGATAATCACCACGCCAGCCACGGCCACCACAACTCC

CACCACCCTCAGCACCATCATCACCATCATCACCACCACCACCACCCACCTCCACCAGCACCA

CAGCCTCCACCCCCTCCACAGCAGCAGCAGCCTCCTCCTCCACCTCCACCAGCACCCCAGCCT

| SEQUENCES |
|---|
| CCACAGACCCGCGGCGCCCCTGCCGCCGACGATGACAAGGGACCACAGCAGCTGCTGCTGCCT |
| CCTCCACCCCCTCCACCCCCTGCCGCCGCCCTGGATGGCGCCAAGGCCGACGGCCTGGGAGGC |
| AAGGGAGAGCCTGGAGGAGGACCAGGCGAGCTGGCCCCAGTGGGCCCCGATGAGAAGGAGAAG |
| GGAGCAGGAGCAGGAGGAGAGGAGAAGAAGGGCGCCGGCGAGGGCGGCAAGGATGGAGAGGGC |
| GGCAAGGAGGGCGAGAAGAAGAACGGCAAGTACGAGAAGCCACCCTTCTCTTATAATGCCCTG |
| ATCATGATGGCCATCAGACAGAGCCCCGAGAAGAGGCTGACCCTGAACGGCATCTATGAGTTC |
| ATCATGAAGAATTTTCCTTACTATCGCGAGAACAAGCAGGGCTGGCAGAATTCTATCCGGCAC |
| AACCTGAGCCTGAATAAGTGCTTCGTGAAGGTGCCCAGACACTATGATGACCCTGGCAAGGGC |
| AATTACTGGATGCTGGATCCCAGCTCCGATGACGTGTTTATCGGCGGCACCACAGGCAAGCTG |
| CGGAGAAGGAGCACCACATCCAGGGCAAAGCTGGCCTTCAAGAGGGGAGCAAGGCTGACCAGC |
| ACAGGCCTGACCTTTATGGACAGAGCCGGCTCCCTGTATTGGCCTATGAGCCCATTCCTGTCC |
| CTGCACCACCCAAGGGCCTCTAGCACACTGAGCTACAACGGCACCACATCTGCCTATCCCAGC |
| CACCCTATGCCATACTCCTCTGTGCTGACCCAGAATAGCCTGGGCAACAATCACTCTTTTAGC |
| ACAGCAAACGGCCTGTCCGTGGACAGGCTGGTGAATGGCGAGATCCCATACGCTACCCACCAC |
| CTGACAGCAGCCGCCCTGGCAGCATCCGTGCCATGCGGCCTGTCCGTGCCCTGTTCTGGCACC |
| TATAGCCTGAACCCCTGCTCCGTGAATCTGCTGGCCGGCCAGACATCTTACTTCTTTCCTCAC |
| GTGCCCCACCCTTCTATGACCAGCCAGAGCTCCACATCCATGTCTGCCAGGGCAGCATCTAGC |
| TCCACCTCCCCACAGGCCCCTTCTACACTGCCTTGTGAGTCCCTGCGGCCATCCCTGCCCTCT |
| TTTACCACAGGCCTGTCTGGCGGCCTGTCCGATTACTTCACCCACCAGAACCAGGGCTCCTCC |
| TCAAACCCACTGATTCACTAA |

>CB6-PI promoter nucleic acid sequence
(SEQ ID NO: 4)
CTAGTCGACATTGATTATTGACTAGTTATTAATAGTAATCAATTACGGGGTCATTAGTTCATA
GCCCATATATGGAGTTCCGCGTTACATAACTTACGGTAAATGGCCCGCCTGGCTGACCGCCCA
ACGACCCCCGCCCATTGACGTCAATAATGACGTATGTTCCCATAGTAACGCCAATAGGGACTT
TCCATTGACGTCAATGGGTGGAGTATTTACGGTAAACTGCCCACTTGGCAGTACATCAAGTGT
ATCATATGCCAAGTACGCCCCCTATTGACGTCAATGACGGTAAATGGCCCGCCTGGCATTATG
CCCAGTACATGACCTTATGGGACTTTCCTACTTGGCAGTACATCTACGTATTAGTCATCGCTA
TTACCATGTCGAGGCCACGTTCTGCTTCACTCTCCCCATCTCCCCCCCCTCCCCACCCCCAAT
TTTGTATTTATTTATTTTTTAATTATTTTGTGCAGCGATGGGGGCGGGGGGGGGGGGCGCGCG
CCAGGCGGGGCGGGGCGGGGCGAGGGGCGGGGCGGGGCGAGGCGGAGAGGTGCGGCGGCAGCC
AATCAGAGCGGCGCGCTCCGAAAGTTTCCTTTTATGGCGAGGCGGCGGCGGCGGCGGCCCTAT
AAAAAGCGAAGCGCGCGGCGGGCGGGAGCAAGCTTTATTGCGGTAGTTTATCACAGTTAAATT
GCTAACGCAGTCAGTGCTTCTGACACAACAGTCTCGAACTTAAGCTGCAGAAGTTGGTCGTGA
GGCACTGGGCAGGTAAGTATCAAGGTTACAAGACAGGTTTAAGGAGACCAATAGAAACTGGGC
TTGTCGAGACAGAGAAGACTCTTGCGTTTCTGATAGGCACCTATTGGTCTTACTGACATCCAC
TTTGCCTTTCTCTCCACAG >U1 promoter nucleic acid sequence
(SEQ ID NO: 5)
ATGGAGGCGGTACTATGTAGATGAGAATTCAGGAGCAAACTGGGAAAAGCAACTGCTTCCAAA
TATTTGTGATTTTTACAGTGTAGTTTTGGAAAAACTCTTAGCCTACCAATTCTTCTAAGTGTT

| SEQUENCES |
|---|
| TTAAAATGTGGGAGCCAGTACACATGAAGTTATAGAGTGTTTTAATGAGGCTTAAATATTTAC |
| CGTAACTATGAAATGCTACGCATATCATGCTGTTCAGGCTCCGTGGCCACGCAACTCATACT |

>hSyn1 promoter nucleic acid sequence
(SEQ ID NO: 6)
GAGGGCCCTGCGTATGAGTGCAAGTGGGTTTTAGGACCAGGATGAGGCGGGGTGGGGGTGCCT
ACCTGACGACCGACCCCGACCCACTGGACAAGCACCCAACCCCCATTCCCCAAATTGCGCATC
CCCTATCAGAGAGGGGGAGGGGAAACAGGATGCGGCGAGGCGCGTGCGCACTGCCAGCTTCAG
CACCGCGGACAGTGCCTTCGCCCCCGCCTGGCGGCGCGCGCCACCGCCGCCTCAGCACTGAAG
GCGCGCTGACGTCACTCGCCGGTCCCCCGCAAACTCCCCTTCCCGGCCACCTTGGTCGCGTCC
GCGCCGCCGCCGGCCCAGCCGGACCGCACCACGCGAGGCGCGAGATAGGGGGGCACGGGCGCG
ACCATCTGCGCTGCGGCGCCGGCGACTCAGCGCTGCCTCAGTCTGCGGTGGGCAGCGGAGGAG
TCGTGTCGTGCCTGAGAGCGCAGTCGAGA >hCAMKII promoter nucleic acid sequence
(SEQ ID NO: 7)
ACTTGTGGACTAAGTTTGTTCGCATCCCCTTCTCCAACCCCCTCAGTACATCACCCTGGGGGA
ACAGGGTCCACTTGCTCCTGGGCCCACACAGTCCTGCAGTATTGTGTATATAAGGCCAGGGCA
AAGAGGAGCAGGTTTTAAAGTGAAAGGCAGGCAGGTGTTGGGGAGGCAGTTACCGGGGCAACG
GGAACAGGGCGTTTCGGAGGTGGTTGCCATGGGGACCTGGATGCTGACGAAGGCTCGCGAGGC
TGTGAGCAGCCACAGTGCCCTGCTCAGAAGCCCCAAGCTCGTCAGTCAAGCCGGTTCTCCGTT
TGCACTCAGGAGCACGGGCAGGCGAGTGGCCCCTAGTTCTGGGGCAG >pAAV.CB6-PI-hFOXG1 nucleic acid sequence; no ITRs
(SEQ ID NO: 8)
CTAGTCGACATTGATTATTGACTAGTTATTAATAGTAATCAATTACGGGGTCATTAGTTCATA
GCCCATATATGGAGTTCCGCGTTACATAACTTACGGTAAATGGCCCGCCTGGCTGACCGCCCA
ACGACCCCCGCCCATTGACGTCAATAATGACGTATGTTCCCATAGTAACGCCAATAGGGACTT
TCCATTGACGTCAATGGGTGGAGTATTTACGGTAAACTGCCCACTTGGCAGTACATCAAGTGT
ATCATATGCCAAGTACGCCCCCTATTGACGTCAATGACGGTAAATGGCCCGCCTGGCATTATG
CCCAGTACATGACCTTATGGGACTTTCCTACTTGGCAGTACATCTACGTATTAGTCATCGCTA
TTACCATGTCGAGGCCACGTTCTGCTTCACTCTCCCCATCTCCCCCCCCTCCCCACCCCCAAT
TTTGTATTTATTTATTTTTTAATTATTTTGTGCAGCGATGGGGGCGGGGGGGGGGGCGCGCG
CCAGGCGGGGCGGGGCGGGGCGAGGGGCGGGGCGGGGCGAGGCGGAGAGGTGCGGCGGCAGCC
AATCAGAGCGGCGCGCTCCGAAAGTTTCCTTTTATGGCGAGGCGGCGGCGGCGGCGCCCTAT
AAAAAGCGAAGCGCGCGGCGGGCGGGAGCAAGCTTTATTGCGGTAGTTTATCACAGTTAAATT
GCTAACGCAGTCAGTGCTTCTGACACAACAGTCTCGAACTTAAGCTGCAGAAGTTGGTCGTGA
GGCACTGGGCAGGTAAGTATCAAGGTTACAAGACAGGTTTAAGGAGACCAATAGAAACTGGGC
TTGTCGAGACAGAGAAGACTCTTGCGTTTCTGATAGGCACCTATTGGTCTTACTGACATCCAC
TTTGCCTTTCTCTCCACAGGTGTCCACTCCCAGTTCAATTACAGCTCTTAAGGCTAGAGTACT
TAATACGACTCACTATAGGCTAGCCTCGAGGCCACCATGCTGGACATGGGAGATAGGAAAGAG
GTGAAAATGATCCCCAAGTCCTCGTTCAGCATCAACAGCCTGGTGCCCGAGGCGGTCCAGAAC
GACAACCACCACGCGAGCCACGGCCACCACAACAGCCACCACCCCAGCACCACCACCACCAC
CACCACCATCACCACCACCCGCCGCCGCCCGCCCCGCAACCGCCGCCGCCGCCGCAGCAGCAG

| SEQUENCES |
|---|
| CAGCCGCCGCCGCCGCCGCCCCCGGCACCGCAGCCCCCCCAGACGCGGGGCGCCCCGGCCGCC |
| GACGACGACAAGGGCCCCCAGCAGCTGCTGCTCCCGCCGCCGCCACCGCCACCACCGGCCGCC |
| GCCCTGGACGGGGCTAAAGCGGACGGGCTGGGCGGCAAGGGCGAGCCGGGCGGCGGGCCGGGG |
| GAGCTGGCGCCCGTCGGGCCGGACGAGAAGGAGAAGGGCGCCGGCGCCGGGGGGGAGGAGAAG |
| AAGGGGGCGGGCGAGGGCGGCAAGGACGGGGAGGGGGCAAGGAGGGCGAGAAGAAGAACGGC |
| AAGTACGAGAAGCCGCCGTTCAGCTACAACGCGCTCATCATGATGGCCATCCGGCAGAGCCCC |
| GAGAAGCGGCTCACGCTCAACGGCATCTACGAGTTCATCATGAAGAACTTCCCTTACTACCGC |
| GAGAACAAGCAGGGCTGGCAGAACTCCATCCGCCACAATCTGTCCCTCAACAAGTGCTTCGTG |
| AAGGTGCCGCGCCACTACGACGACCCGGGCAAGGGCAACTACTGGATGCTGGACCCGTCGAGC |
| GACGACGTGTTCATCGGCGGCACCACGGGCAAGCTGCGGCGCCGCTCCACCACCTCGCGGGCC |
| AAGCTGGCCTTCAAGCGCGGTGCGCGCCTCACCTCCACCGGCCTCACCTTCATGGACCGCGCC |
| GGCTCCCTCTACTGGCCCATGTCGCCCTTCCTGTCCCTGCACCACCCCGCGCCAGCAGCACT |
| TTGAGTTACAACGGCACCACGTCGGCCTACCCCAGCCACCCCATGCCCTACAGCTCCGTGTTG |
| ACTCAGAACTCGCTGGGCAACAACCACTCCTTCTCCACCGCCAACGGCCTGAGCGTGGACCGG |
| CTGGTCAACGGGGAGATCCCGTACGCCACGCACCACCTCACGGCCGCCGCGCTAGCCGCCTCG |
| GTGCCCTGCGGCCTGTCGGTGCCCTGCTCTGGGACCTACTCCCTCAACCCCTGCTCCGTCAAC |
| CTGCTCGCGGGCCAGACCAGTTACTTTTTCCCCCACGTCCCGCACCCGTCAATGACTTCGCAG |
| AGCAGCACGTCCATGAGCGCCAGGGCCGCGTCCTCCTCCACGTCGCCGCAGGCCCCCTCGACC |
| CTGCCCTGTGAGTCTTTAAGACCCTCTTTGCCAAGTTTTACGACGGGACTGTCTGGGGGACTG |
| TCTGATTATTTCACACATCAAAATCAGGGGTCTTCTTCCAACCCTTTAATACATTAAGGTACC |
| TCTAGAGTCGAGGACGGGGTGAACTACGCCTGAGGATCCGATCTTTTTCCCTCTGCCAAAAAT |
| TATGGGGACATCATGAAGCCCCTTGAGCATCTGACTTCTGGCTAATAAAGGAAATTTATTTTC |
| ATTGCAATAGTGTGTTGGAATTTTTTGTGTCTCTCACTCG |
| >pAAV.CB6-PI-opthFOXG1 nucleic acid sequence; no ITRs<br>(SEQ ID NO: 9)<br>CTAGTCGACATTGATTATTGACTAGTTATTAATAGTAATCAATTACGGGGTCATTAGTTCATA |
| GCCCATATATGGAGTTCCGCGTTACATAACTTACGGTAAATGGCCCGCCTGGCTGACCGCCCA |
| ACGACCCCCGCCCATTGACGTCAATAATGACGTATGTTCCCATAGTAACGCCAATAGGGACTT |
| TCCATTGACGTCAATGGGTGGAGTATTTACGGTAAACTGCCCACTTGGCAGTACATCAAGTGT |
| ATCATATGCCAAGTACGCCCCCTATTGACGTCAATGACGGTAAATGGCCCGCCTGGCATTATG |
| CCCAGTACATGACCTTATGGGACTTTCCTACTTGGCAGTACATCTACGTATTAGTCATCGCTA |
| TTACCATGTCGAGGCCACGTTCTGCTTCACTCTCCCCATCTCCCCCCCCTCCCCACCCCCAAT |
| TTTGTATTTATTTATTTTTAATTATTTTGTGCAGCGATGGGGGCGGGGGGGGGGCGCGCG |
| CCAGGCGGGGCGGGGCGGGGCGAGGGGCGGGGCGGGGCGAGGCGGAGAGGTGCGGCGGCAGCC |
| AATCAGAGCGGCGCGCTCCGAAAGTTTCCTTTTATGGCGAGGCGGCGGCGGCGGCGGCCCTAT |
| AAAAAGCGAAGCGCGCGGCGGGCGGGAGCAAGCTTTATTGCGGTAGTTTATCACAGTTAAATT |
| GCTAACGCAGTCAGTGCTTCTGACACAACAGTCTCGAACTTAAGCTGCAGAAGTTGGTCGTGA |
| GGCACTGGGCAGGTAAGTATCAAGGTTACAAGACAGGTTTAAGGAGACCAATAGAAACTGGGC |
| TTGTCGAGACAGAGAAGACTCTTGCGTTTCTGATAGGCACCTATTGGTCTTACTGACATCCAC |
| TTTGCCTTTCTCTCCACAGGTGTCCACTCCCAGTTCAATTACAGCTCTTAAGGCTAGAGTACT |

| SEQUENCES |
|---|
| TAATACGACTCACTATAGGCTAGCCTCGAGGCCACCATGCTGGACATGGGCGATAGGAAGGAA |
| GTCAAGATGATCCCCAAGAGTAGTTTCTCAATCAATAGCCTGGTGCCCGAAGCCGTGCAGAAC |
| GATAATCACCACGCCAGCCACGGCCACCACAACTCCCACCACCCTCAGCACCATCATCACCAT |
| CATCACCACCACCACCACCCACCTCCACCAGCACCACAGCCTCCACCCCCTCCACAGCAGCAG |
| CAGCCTCCTCCTCCACCTCCACCAGCACCCCAGCCTCCACAGACCCGCGGCGCCCCTGCCGCC |
| GACGATGACAAGGGACCACAGCAGCTGCTGCTGCCTCCTCCACCCCCTCCACCCCCTGCCGCC |
| GCCCTGGATGGCGCCAAGGCCGACGGCCTGGGAGGCAAGGGAGAGCCTGGAGGAGGACCAGGC |
| GAGCTGGCCCCAGTGGGCCCCGATGAGAAGGAGAAGGGAGCAGGAGCAGGAGGAGAGGAGAAG |
| AAGGGCGCCGGCGAGGGCGGCAAGGATGGAGAGGGCGGCAAGGAGGGCGAGAAGAAGAACGGC |
| AAGTACGAGAAGCCACCCTTCTCTTATAATGCCCTGATCATGATGGCCATCAGACAGAGCCCC |
| GAGAAGAGGCTGACCCTGAACGGCATCTATGAGTTCATCATGAAGAATTTTCCTTACTATCGC |
| GAGAACAAGCAGGGCTGGCAGAATTCTATCCGGCACAACCTGAGCCTGAATAAGTGCTTCGTG |
| AAGGTGCCCAGACACTATGATGACCCTGGCAAGGGCAATTACTGGATGCTGGATCCCAGCTCC |
| GATGACGTGTTTATCGGCGGCACCACAGGCAAGCTGCGGAGAAGGAGCACCACATCCAGGGCA |
| AAGCTGGCCTTCAAGAGGGGAGCAAGGCTGACCAGCACAGGCCTGACCTTTATGGACAGAGCC |
| GGCTCCCTGTATTGGCCTATGAGCCCATTCCTGTCCCTGCACCACCCAAGGGCCTCTAGCACA |
| CTGAGCTACAACGGCACCACATCTGCCTATCCCAGCCACCCTATGCCATACTCCTCTGTGCTG |
| ACCCAGAATAGCCTGGGCAACAATCACTCTTTTAGCACAGCAAACGGCCTGTCCGTGGACAGG |
| CTGGTGAATGGCGAGATCCCATACGCTACCCACCACCTGACAGCAGCCGCCCTGGCAGCATCC |
| GTGCCATGCGGCCTGTCCGTGCCCTGTTCTGGCACCTATAGCCTGAACCCCTGCTCCGTGAAT |
| CTGCTGGCCGGCCAGACATCTTACTTCTTTCCTCACGTGCCCCACCCTTCTATGACCAGCCAG |
| AGCTCCACATCCATGTCTGCCAGGGCAGCATCTAGCTCCACCTCCCCACAGGCCCCTTCTACA |
| CTGCCTTGTGAGTCCCTGCGGCCATCCCTGCCCTCTTTTACCACAGGCCTGTCTGGCGGCCTG |
| TCCGATTACTTCACCCACCAGAACCAGGGCTCCTCCTCAAACCCACTGATTCACTAAGGTACC |
| TCTAGAGTCGAGGACGGGGTGAACTACGCCTGAGGATCCGATCTTTTTCCCTCTGCCAAAAAT |
| TATGGGGACATCATGAAGCCCCTTGAGCATCTGACTTCTGGCTAATAAAGGAAATTTATTTTC |
| ATTGCAATAGTGTGTTGGAATTTTTTGTGTCTCTCACTCG |

>pAAVsc.U1a-hFOXG1 nucleic acid sequence; no ITRs
(SEQ ID NO: 10)

ATGGAGGCGGTACTATGTAGATGAGAATTCAGGAGCAAACTGGGAAAAGCAACTGCTTCCAAA

TATTTGTGATTTTTACAGTGTAGTTTTGGAAAAACTCTTAGCCTACCAATTCTTCTAAGTGTT

TTAAAATGTGGGAGCCAGTACACATGAAGTTATAGAGTGTTTTAATGAGGCTTAAATATTTAC

CGTAACTATGAAATGCTACGCATATCATGCTGTTCAGGCTCCGTGGCCACGCAACTCATACTA

CCGGTGCCACCATGCTGGACATGGGAGATAGGAAAGAGGTGAAAATGATCCCCAAGTCCTCGT

TCAGCATCAACAGCCTGGTGCCCGAGGCGGTCCAGAACGACAACCACCACGCGAGCCACGGCC

ACCACAACAGCCACCACCCCCAGCACCACCACCACCACCACCATCACCACCACCCGCCGC

CGCCCGCCCCGCAACCGCCGCCGCCGCCGCAGCAGCAGCAGCCGCCGCCGCCGCCGCCCCCGG

CACCGCAGCCCCCCAGACGCGGGGCGCCCCGGCCGCCGACGACGACAAGGGCCCCAGCAGC

TGCTGCTCCCGCCGCCGCCACCGCCACCACCGGCCGCCGCCCTGGACGGGGCTAAAGCGGACG

| SEQUENCES |
| --- |
| GGCTGGGCGGCAAGGGCGAGCCGGGCGGCGGGCCGGGGGAGCTGGCGCCCGTCGGGCCGGACG |
| AGAAGGAGAAGGGCGCCGGCGCCGGGGGGAGGAGAAGAAGGGGCGGGCGAGGGCGGCAAGG |
| ACGGGGAGGGGGCAAGGAGGGCGAGAAGAAGAACGGCAAGTACGAGAAGCCGCCGTTCAGCT |
| ACAACGCGCTCATCATGATGGCCATCCGGCAGAGCCCCGAGAAGCGGCTCACGCTCAACGGCA |
| TCTACGAGTTCATCATGAAGAACTTCCCTTACTACCGCGAGAACAAGCAGGGCTGGCAGAACT |
| CCATCCGCCACAATCTGTCCCTCAACAAGTGCTTCGTGAAGGTGCCGCGCCACTACGACGACC |
| CGGGCAAGGGCAACTACTGGATGCTGGACCCGTCGAGCGACGACGTGTTCATCGGCGGCACCA |
| CGGGCAAGCTGCGGCGCCGCTCCACCACCTCGCGGGCCAAGCTGGCCTTCAAGCGCGGTGCGC |
| GCCTCACCTCCACCGGCCTCACCTTCATGGACCGCGCCGGCTCCCTCTACTGGCCCATGTCGC |
| CCTTCCTGTCCCTGCACCACCCCCGCGCCAGCAGCACTTTGAGTTACAACGGCACCACGTCGG |
| CCTACCCCAGCCACCCCATGCCCTACAGCTCCGTGTTGACTCAGAACTCGCTGGGCAACAACC |
| ACTCCTTCTCCACCGCCAACGGCCTGAGCGTGGACCGGCTGGTCAACGGGGAGATCCCGTACG |
| CCACGCACCACCTCACGGCCGCCGCGCTAGCCGCCTCGGTGCCCTGCGGCCTGTCGGTGCCCT |
| GCTCTGGGACCTACTCCCTCAACCCCTGCTCCGTCAACCTGCTCGCGGGCCAGACCAGTTACT |
| TTTTCCCCCACGTCCCGCACCCGTCAATGACTTCGCAGAGCAGCACGTCCATGAGCGCCAGGG |
| CCGCGTCCTCCTCCACGTCGCCGCAGGCCCCCTCGACCCTGCCCTGTGAGTCTTTAAGACCCT |
| CTTTGCCAAGTTTTACGACGGGACTGTCTGGGGGACTGTCTGATTATTTCACACATCAAAATC |
| AGGGGTCTTCTTCCAACCCTTTAATACATTAAGGATCCGATCTTTTTCCCTCTGCCAAAAATT |
| ATGGGGACATCATGAAGCCCCTTGAGCATCTGACTTCTGGCTAATAAAGGAAATTTATTTTCA |
| TTGCAATAGTGTGTTGGAATTTTTTGTGTCTCTCACTCG |

>pAAVsc.U1a-opthFOXG1 nucleic acid sequence; no ITRs  
(SEQ ID NO: 11)

| |
| --- |
| ATGGAGGCGGTACTATGTAGATGAGAATTCAGGAGCAAACTGGGAAAAGCAACTGCTTCCAAA |
| TATTTGTGATTTTTACAGTGTAGTTTTGGAAAAACTCTTAGCCTACCAATTCTTCTAAGTGTT |
| TTAAAATGTGGGAGCCAGTACACATGAAGTTATAGAGTGTTTTAATGAGGCTTAAATATTTAC |
| CGTAACTATGAAATGCTACGCATATCATGCTGTTCAGGCTCCGTGGCCACGCAACTCATACTA |
| CCGGTGCCACCATGCTGGACATGGGCGATAGGAAGGAAGTCAAGATGATCCCCAAGAGTAGTT |
| TCTCAATCAATAGCCTGGTGCCCGAAGCCGTGCAGAACGATAATCACCACGCCAGCCACGGCC |
| ACCACAACTCCCACCACCCCTCAGCACCATCATCACCATCATCACCACCACCACCCACCTC |
| CACCAGCACCACAGCCTCCACCCCCTCCACAGCAGCAGCAGCCTCCTCCTCCACCTCCACCAG |
| CACCCCAGCCTCCACAGACCCGCGGCGCCCCTGCCGCCGACGATGACAAGGGACCACAGCAGC |
| TGCTGCTGCCTCCTCCACCCCCTCCACCCCCTGCCGCCGCCCTGGATGGCGCCAAGGCCGACG |
| GCCTGGAGGCAAGGGAGAGCCTGGAGGAGGACCAGGCGAGCTGGCCCCAGTGGGCCCCGATG |
| AGAAGGAGAAGGGAGCAGGAGCAGGAGGAGAGGAGAAGAAGGGCGCCGGCGAGGGCGGCAAGG |
| ATGGAGAGGGCGGCAAGGAGGGCGAGAAGAAGAACGGCAAGTACGAGAAGCCACCCTTCTCTT |
| ATAATGCCCTGATCATGATGGCCATCAGACAGAGCCCCGAGAAGAGGCTGACCCTGAACGGCA |
| TCTATGAGTTCATCATGAAGAATTTTCCTTACTATCGCGAGAACAAGCAGGGCTGGCAGAATT |
| CTATCCGGCACAACCTGAGCCTGAATAAGTGCTTCGTGAAGGTGCCCAGACACTATGATGACC |
| CTGGCAAGGGCAATTACTGGATGCTGGATCCCAGCTCCGATGACGTGTTTATCGGCGGCACCA |
| CAGGCAAGCTGCGGAGAAGGAGCACCACATCCAGGGCAAAGCTGGCCTTCAAGAGGGGAGCAA |

| SEQUENCES |
|---|
| GGCTGACCAGCACAGGCCTGACCTTTATGGACAGAGCCGGCTCCCTGTATTGGCCTATGAGCC |
| CATTCCTGTCCCTGCACCACCCAAGGGCCTCTAGCACACTGAGCTACAACGGCACCACATCTG |
| CCTATCCCAGCCACCCTATGCCATACTCCTCTGTGCTGACCCAGAATAGCCTGGGCAACAATC |
| ACTCTTTTAGCACAGCAAACGGCCTGTCCGTGGACAGGCTGGTGAATGGCGAGATCCCATACG |
| CTACCCACCACCTGACAGCAGCCGCCCTGGCAGCATCCGTGCCATGCGGCCTGTCCGTGCCCT |
| GTTCTGGCACCTATAGCCTGAACCCCTGCTCCGTGAATCTGCTGGCCGGCCAGACATCTTACT |
| TCTTTCCTCACGTGCCCCACCCTTCTATGACCAGCCAGAGCTCCACATCCATGTCTGCCAGGG |
| CAGCATCTAGCTCCACCTCCCCACAGGCCCCTTCTACACTGCCTTGTGAGTCCCTGCGGCCAT |
| CCCTGCCCTCTTTTACCACAGGCCTGTCTGGCGGCCTGTCCGATTACTTCACCCACCAGAACC |
| AGGGCTCCTCCTCAAACCCACTGATTCACTAAGGATCCGATCTTTTTCCCTCTGCCAAAAATT |
| ATGGGGACATCATGAAGCCCCTTGAGCATCTGACTTCTGGCTAATAAAGGAAATTTATTTTCA |
| TTGCAATAGTGTGTTGGAATTTTTTGTGTCTCTCACTCG |

>pAAVsc.hSyn1-opthFOXG1 nucleic acid sequence; no ITRs
(SEQ ID NO: 12)

| |
|---|
| GAGGGCCCTGCGTATGAGTGCAAGTGGGTTTTAGGACCAGGATGAGGCGGGGTGGGGGTGCCT |
| ACCTGACGACCGACCCCGACCCACTGGACAAGCACCCAACCCCCATTCCCCAAATTGCGCATC |
| CCCTATCAGAGAGGGGGAGGGGAAACAGGATGCGGCGAGGCGCGTGCGCACTGCCAGCTTCAG |
| CACCGCGGACAGTGCCTTCGCCCCCGCCTGGCGGCGCGCGCCACCGCCGCCTCAGCACTGAAG |
| GCGCGCTGACGTCACTCGCCGGTCCCCCGCAAACTCCCCTTCCCGGCCACCTTGGTCGCGTCC |
| GCGCCGCCGCCGGCCCAGCCGGACCGCACCACGCGAGGCGCGAGATAGGGGGCACGGGCGCG |
| ACCATCTGCGCTGCGGCGCCGGCGACTCAGCGCTGCCTCAGTCTGCGGTGGGCAGCGGAGGAG |
| TCGTGTCGTGCCTGAGAGCGCAGTCGAGAACCGGTGCCACCATGCTGGACATGGGCGATAGGA |
| AGGAAGTCAAGATGATCCCCAAGAGTAGTTTCTCAATCAATAGCCTGGTGCCCGAAGCCGTGC |
| AGAACGATAATCACCACGCCAGCCACGGCCACCACAACTCCCACCACCCTCAGCACCATCATC |
| ACCATCATCACCACCACCACCACCCACCTCCACCAGCACCACAGCCTCCACCCCCTCCACAGC |
| AGCAGCAGCCTCCTCCTCCACCTCCACCAGCACCCCAGCCTCCACAGACCCGCGGCGCCCCTG |
| CCGCCGACGATGACAAGGGACCACAGCAGCTGCTGCTGCCTCCTCCACCCCCTCCACCCCCTG |
| CCGCCGCCCTGGATGGCGCCAAGGCCGACGGCCTGGGAGGCAAGGGAGAGCCTGGAGGAGGAC |
| CAGGCGAGCTGGCCCCAGTGGGCCCCGATGAGAAGGAGAAGGGAGCAGGAGCAGGAGGAGAGG |
| AGAAGAAGGGCGCCGGCGAGGGCGGCAAGGATGGAGAGGGCGGCAAGGAGGGCGAGAAGAAGA |
| ACGGCAAGTACGAGAAGCCACCCTTCTCTTATAATGCCCTGATCATGATGGCCATCAGACAGA |
| GCCCCGAGAAGAGGCTGACCCTGAACGGCATCTATGAGTTCATCATGAAGAATTTTCCTTACT |
| ATCGCGAGAACAAGCAGGGCTGGCAGAATTCTATCCGGCACAACCTGAGCCTGAATAAGTGCT |
| TCGTGAAGGTGCCCAGACACTATGATGACCCTGGCAAGGGCAATTACTGGATGCTGGATCCCA |
| GCTCCGATGACGTGTTTATCGGCGGCACCACAGGCAAGCTGCGGAGAAGGAGCACCACATCCA |
| GGGCAAAGCTGGCCTTCAAGAGGGGAGCAAGGCTGACCAGCACAGGCCTGACCTTTATGGACA |
| GAGCCGGCTCCCTGTATTGGCCTATGAGCCCATTCCTGTCCCTGCACCACCCAAGGGCCTCTA |
| GCACACTGAGCTACAACGGCACCACATCTGCCTATCCCAGCCACCCTATGCCATACTCCTCTG |
| TGCTGACCCAGAATAGCCTGGGCAACAATCACTCTTTTAGCACAGCAAACGGCCTGTCCGTGG |

-continued

| SEQUENCES |
|---|
| ACAGGCTGGTGAATGGCGAGATCCCATACGCTACCCACCACCTGACAGCAGCCGCCCTGGCAG |
| CATCCGTGCCATGCGGCCTGTCCGTGCCCTGTTCTGGCACCTATAGCCTGAACCCCTGCTCCG |
| TGAATCTGCTGGCCGGCCAGACATCTTACTTCTTTCCTCACGTGCCCCACCCTTCTATGACCA |
| GCCAGAGCTCCACATCCATGTCTGCCAGGGCAGCATCTAGCTCCACCTCCCCACAGGCCCCTT |
| CTACACTGCCTTGTGAGTCCCTGCGGCCATCCCTGCCCTCTTTTACCACAGGCCTGTCTGGCG |
| GCCTGTCCGATTACTTCACCCACCAGAACCAGGGCTCCTCCTCAAACCCACTGATTCACTAAG |
| GATCCGATCTTTTTCCCTCTGCCAAAAATTATGGGGACATCATGAAGCCCCTTGAGCATCTGA |
| CTTCTGGCTAATAAAGGAAATTTATTTTCATTGCAATAGTGTGTTGGAATTTTTTGTGTCTCT |
| CACTCG |
| >pAAVsc.hCAMKII-opthFOXG1 nucleic acid sequence; no ITRs (SEQ ID NO: 13) |
| ACTTGTGGACTAAGTTTGTTCGCATCCCCTTCTCCAACCCCCTCAGTACATCACCCTGGGGA |
| ACAGGGTCCACTTGCTCCTGGGCCCACACAGTCCTGCAGTATTGTGTATATAAGGCCAGGGCA |
| AAGAGGAGCAGGTTTTAAAGTGAAAGGCAGGCAGGTGTTGGGGAGGCAGTTACCGGGGCAACG |
| GGAACAGGGCGTTTCGGAGGTGGTTGCCATGGGGACCTGGATGCTGACGAAGGCTCGCGAGGC |
| TGTGAGCAGCCACAGTGCCCTGCTCAGAAGCCCCAAGCTCGTCAGTCAAGCCGGTTCTCCGTT |
| TGCACTCAGGAGCACGGGCAGGCGAGTGGCCCCTAGTTCTGGGGGCAGACCGGTGCCACCATG |
| CTGGACATGGGCGATAGGAAGGAAGTCAAGATGATCCCCAAGAGTAGTTTCTCAATCAATAGC |
| CTGGTGCCCGAAGCCGTGCAGAACGATAATCACCACGCCAGCCACGGCCACCACAACTCCCAC |
| CACCCTCAGCACCATCATCACCATCATCACCACCACCACCACCCACCTCCACCAGCACCACAG |
| CCTCCACCCCCTCCACAGCAGCAGCAGCCTCCTCCTCCACCTCCACCAGCACCCCAGCCTCCA |
| CAGACCCGCGGCGCCCCTGCCGCCGACGATGACAAGGGACCACAGCAGCTGCTGCTGCCTCCT |
| CCACCCCCTCCACCCCCTGCCGCCGCCCTGGATGGCGCCAAGGCCGACGGCCTGGGAGGCAAG |
| GGAGAGCCTGGAGGAGGACCAGGCGAGCTGGCCCCAGTGGGCCCCGATGAGAAGGAGAAGGGA |
| GCAGGAGCAGGAGGAGAGGAGAAGAAGGGCGCCGGCGAGGGCGGCAAGGATGGAGAGGGCGGC |
| AAGGAGGGCGAGAAGAAGAACGGCAAGTACGAGAAGCCACCCTTCTCTTATAATGCCCTGATC |
| ATGATGGCCATCAGACAGAGCCCCGAGAAGAGGCTGACCCTGAACGGCATCTATGAGTTCATC |
| ATGAAGAATTTTCCTTACTATCGCGAGAACAAGCAGGGCTGGCAGAATTCTATCCGGCACAAC |
| CTGAGCCTGAATAAGTGCTTCGTGAAGGTGCCCAGACACTATGATGACCCTGGCAAGGGCAAT |
| TACTGGATGCTGGATCCCAGCTCCGATGACGTGTTTATCGGCGGCACCACAGGCAAGCTGCGG |
| AGAAGGAGCACCACATCCAGGGCAAAGCTGGCCTTCAAGAGGGGAGCAAGGCTGACCAGCACA |
| GGCCTGACCTTTATGGACAGAGCCGGCTCCCTGTATTGGCCTATGAGCCCATTCCTGTCCCTG |
| CACCACCCAAGGGCCTCTAGCACACTGAGCTACAACGGCACCACATCTGCCTATCCCAGCCAC |
| CCTATGCCATACTCCTCTGTGCTGACCCAGAATAGCCTGGGCAACAATCACTCTTTTAGCACA |
| GCAAACGGCCTGTCCGTGGACAGGCTGGTGAATGGCGAGATCCCATACGCTACCCACCACCTG |
| ACAGCAGCCGCCCTGGCAGCATCCGTGCCATGCGGCCTGTCCGTGCCCTGTTCTGGCACCTAT |
| AGCCTGAACCCCTGCTCCGTGAATCTGCTGGCCGGCCAGACATCTTACTTCTTTCCTCACGTG |
| CCCCACCCTTCTATGACCAGCCAGAGCTCCACATCCATGTCTGCCAGGGCAGCATCTAGCTCC |
| ACCTCCCCACAGGCCCCTTCTACACTGCCTTGTGAGTCCCTGCGGCCATCCCTGCCCTCTTTT |
| ACCACAGGCCTGTCTGGCGGCCTGTCCGATTACTTCACCCACCAGAACCAGGGCTCCTCCTCA |

| SEQUENCES |
|---|
| AACCCACTGATTCACTAAGGATCCGATCTTTTTCCCTCTGCCAAAAATTATGGGGACATCATG |
| AAGCCCCTTGAGCATCTGACTTCTGGCTAATAAAGGAAATTTATTTTCATTGCAATAGTGTGT |
| TGGAATTTTTTGTGTCTCTCACTCG |
| >AAV2 ITR nucleic acid sequence (SEQ ID NO: 14) |
| CCTGCAGGCAGCTGCGCGCTCGCTCGCTCACTGAGGCCGCCCGGGCAAAGCCCGGGCGTCGGG |
| CGACCTTTGGTCGCCCGGCCTCAGTGAGCGAGCGAGCGCGCAGAGAGGGAGTGGCCAACTCCA |
| TCACTAGGGGTTCCT |

What is claimed is:

1. A recombinant adeno-associated virus (rAAV) comprising an isolated nucleic acid, and at least one AAV capsid protein;
    wherein the isolated nucleic acid comprises the nucleic acid sequence set forth in any one of SEQ ID NOs: 3 and 8-13.

2. The rAAV of claim 1, wherein the isolated nucleic acid encodes a protein comprising the amino acid sequence set forth in SEQ ID NO: 1.

3. The rAAV of claim 1, further comprising a promoter that is operably linked to the nucleic acid sequence set forth in SEQ ID NO: 3, wherein the promoter comprises a chicken beta-actin (CB) promoter, a Ula promoter, or a neuron-specific promoter.

4. The rAAV of claim 3, wherein the neuron-specific promoter comprises a human synapsin 1 (hSyn1) promoter or a human Ca 2+/calmodulin-dependent protein kinase II (hCAMKII) promoter.

5. The rAAV of claim 1, wherein the at least one capsid protein is an AAV9 capsid protein or an AAV·PHP-eB capsid protein.

6. An isolated nucleic acid comprising an expression cassette having a transgene that encodes a Forkhead box G1 (FOXG1) protein flanked by adeno-associated virus (AAV) inverted terminal repeats (ITRs); wherein the transgene comprises the nucleic acid sequence set forth in any one of SEQ ID NOs: 3 and 8-13.

7. The isolated nucleic acid of claim 6, wherein the expression cassette comprises a promoter operably linked to the transgene.

8. The isolated nucleic acid of claim 7, wherein the promoter is a constitutive promoter, inducible promoter, or tissue-specific promoter.

9. The isolated nucleic acid of claim 7, wherein the promoter comprises a chicken beta-actin promoter, a Ula promoter, or a neuron-specific promoter.

10. The isolated nucleic acid of claim 6, wherein at least one AAV ITR is a ΔITR.

11. A recombinant adeno-associated virus (rAAV) comprising:
    (i) the isolated nucleic acid of claim 6; and
    (ii) at least one AAV capsid protein.

12. The rAAV of claim 11, wherein the rAAV is a self-complementary AAV (scAAV).

13. The rAAV of claim 11, wherein the at least one capsid protein is selected from AAV1, AAV2, AAV3, AAV4, AAV5, AAV6, AAB7, AAV8, AAV9, AAV·PHP-eB, or a variant of any of the foregoing.

14. A method for treating FOXG1 deficiency in a subject in need thereof, the method comprising administering to a cell of the subject the isolated nucleic acid of claim 6.

15. A method for delivering the transgene to a cell, the method comprising administering to the cell the isolated nucleic acid of claim 6.

* * * * *